(12) United States Patent
Kanayama et al.

(10) Patent No.: US 10,913,251 B2
(45) Date of Patent: Feb. 9, 2021

(54) BUFFER MATERIAL, BUFFER MATERIAL FOR COATING ROBOT, ROBOT WITH BUFFER MATERIAL, AND COATING ROBOT WITH BUFFER MATERIAL

(71) Applicant: MITSUI CHEMICALS, INC., Tokyo (JP)

(72) Inventors: Hiroshi Kanayama, Chiba (JP); Minoru Watanabe, Kawasaki (JP); Makoto Kajiura, Ichihara (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 229 days.

(21) Appl. No.: 15/755,297

(22) PCT Filed: Sep. 1, 2016

(86) PCT No.: PCT/JP2016/075587
§ 371 (c)(1),
(2) Date: Feb. 26, 2018

(87) PCT Pub. No.: WO2017/038910
PCT Pub. Date: Mar. 9, 2017

(65) Prior Publication Data
US 2018/0257355 A1 Sep. 13, 2018

(30) Foreign Application Priority Data
Sep. 1, 2015 (JP) .................. 2015-171753

(51) Int. Cl.
| | |
|---|---|
| C08J 9/34 | (2006.01) |
| B32B 27/40 | (2006.01) |
| B32B 5/18 | (2006.01) |
| C08G 18/00 | (2006.01) |
| C08J 9/36 | (2006.01) |
| B32B 5/32 | (2006.01) |
| B32B 27/06 | (2006.01) |
| C08L 75/04 | (2006.01) |
| C09D 175/04 | (2006.01) |

(52) U.S. Cl.
CPC .............. *B32B 27/40* (2013.01); *B32B 5/18* (2013.01); *B32B 5/32* (2013.01); *B32B 27/065* (2013.01); *C08G 18/00* (2013.01); *C08J 9/34* (2013.01); *C08J 9/365* (2013.01); *C08L 75/04* (2013.01); *C09D 175/04* (2013.01); *B32B 2250/02* (2013.01); *B32B 2553/02* (2013.01); *C08J 2207/04* (2013.01); *C08J 2375/04* (2013.01); *C08J 2475/04* (2013.01); *C08L 2203/14* (2013.01); *C08L 2205/025* (2013.01)

(58) Field of Classification Search
CPC .......... B32B 5/18; B32B 5/32; B32B 27/065; B32B 27/40; B32B 2250/02; B32B 2553/02; C08G 18/00; C08J 9/34; C08J 9/365; C08J 2207/04; C08J 2375/04; C08J 2475/04; C08L 75/04; C08L 2203/14; C08L 2205/025; C09D 175/04
See application file for complete search history.

(56) References Cited

U.S. PATENT DOCUMENTS

| | | | |
|---|---|---|---|
| 4,292,411 A | 9/1981 | Jourquin | |
| 4,455,340 A | 6/1984 | Okina | |
| 4,524,102 A | 6/1985 | Hostettler | |
| 2006/0131791 A1 | 6/2006 | Suzuki | |
| 2008/0261022 A1 | 10/2008 | Zhang et al. | |
| 2010/0189473 A1* | 7/2010 | Sugimura | G03G 15/0818 399/286 |
| 2011/0171277 A1 | 7/2011 | Schönberger | |
| 2012/0313421 A1* | 12/2012 | Kondo | A47C 27/15 297/452.48 |

(Continued)

FOREIGN PATENT DOCUMENTS

| | | |
|---|---|---|
| GB | 2137559 A1 | 10/1984 |
| JP | S55123615 A | 9/1980 |

(Continued)

OTHER PUBLICATIONS

Wirtz, Hahns; Integral Skin Urethane Foam Molding (1969) Journal of Cellular Plastics; Sep./Oct.; pp. 304-309.*
International Search Report dated Nov. 29, 2016 filed in PCT/JP2016/075587.
Extended European Search Report dated Feb. 11, 2019 for the corresponding European Patent Application No. 16841939.8.

(Continued)

*Primary Examiner* — John M Cooney
(74) *Attorney, Agent, or Firm* — Rankin, Hill & Clark LLP

(57) ABSTRACT

A buffer material including a skinned polyurethane foam including a foam layer and a skin layer formed on the surface of the foam layer, wherein the skinned polyurethane foam essentially contains no silicone compound, the foam layer is polyurethane foam, the skin layer is a polyurethane resin layer produced by reaction of a skin-isocyanate component containing an aliphatic and/or an alicyclic polyisocyanate with a skin-active hydrogen group-containing component, the skin layer has a storage modulus at 23° C. ($E'_{coat}$) of $1 \times 10^7$ Pa or more and $3 \times 10^8$ Pa or less, the foam layer has a storage modulus at 23° C. ($E'_{foam}$) of $1 \times 10^5$ Pa or more and $5 \times 10^6$ Pa or less, and the ratio ($E'_{coat}/E'_{foam}$) of the storage modulus at 23° C. ($E'_{coat}$) of the skin layer relative to the storage modulus at 23° C. ($E'_{foam}$) of the foam layer is 10 or more and 500 or less.

7 Claims, 2 Drawing Sheets

(56) References Cited

U.S. PATENT DOCUMENTS

| | | |
|---|---|---|
| 2013/0184367 A1 | 7/2013 | Pfeuffer |
| 2015/0174771 A1 | 6/2015 | Fujita |

FOREIGN PATENT DOCUMENTS

| | | |
|---|---|---|
| JP | 68-22154 A | 2/1983 |
| JP | S59097896 A | 6/1984 |
| JP | H09104738 A | 4/1997 |
| JP | 2000167450 A | 6/2000 |
| JP | 2002-241460 A | 8/2002 |
| JP | 2006169436 A | 6/2006 |
| JP | 2006291129 A | 10/2006 |
| JP | 2008-514460 A | 5/2008 |
| JP | 4781420 B | 9/2011 |
| JP | 2012-502708 A | 2/2012 |
| JP | 2013537922 A | 10/2013 |
| JP | 2015003945 A | 1/2015 |
| JP | 2015123505 A | 7/2015 |
| JP | 2016-204403 A | 12/2016 |
| WO | 2013141207 A1 | 9/2013 |

OTHER PUBLICATIONS

International Preliminary Report on Patentability dated Nov. 29, 2016 filed in PCT/JP2016/075587 total 11 pages.

* cited by examiner

BUFFER MATERIAL, BUFFER MATERIAL FOR COATING ROBOT, ROBOT WITH BUFFER MATERIAL, AND COATING ROBOT WITH BUFFER MATERIAL

TECHNICAL FIELD

The present invention relates to a buffer material, a buffer material for coating robot, a robot-with-buffer material, and a coating robot-with-buffer material. In particular, the present invention relates to a buffer material, a buffer material for coating robot, and a robot-with-buffer material including the buffer material, and furthermore, a coating robot-with-buffer material having the buffer material for coating robot.

BACKGROUND ART

Conventionally, polyurethane foam (polyurethane foam elastomer, etc.) has been used as a buffer material such as cushioning materials and shock absorbing materials. It has been also known that it is used as a skinned polyurethane foam, with a sheet (skin layer) provided on the surface of the polyurethane foam.

To be more specific, for example, Patent Document 1 below has proposed covering a movable portion or projected portion of robot that moves by previously memorized operation command with a cushioning material composed of urethane foam, and attaching a resin sheet such as heat resistant vinyl as exterior of the cushioning material.

Such a robot has been used in various fields industrially, and recently is placed in, for example, production line for electric and electronic components (semiconductor, etc.), or production line of automobile bodies.

CITATION LIST

Patent Document

Patent Document 1: Japanese Patent Publication Sho. 59-97896

SUMMARY OF INVENTION

Problem to be Solved by the Invention

Meanwhile, urethane foam such as the one described in Patent Document 1 usually contains a silicone compound as a silicone-based foam stabilizer.

However, urethane foam containing the silicone compound may release cyclic siloxane derived from the silicone compound.

Therefore, for example, when urethane foam containing the silicone compound is used as the cushioning material of robots in production line of electric and electronic components (semiconductor, etc.), released cyclic siloxane may form coating on the electric and electronic component (semiconductor, etc.), which may cause conductive failure.

Furthermore, when the urethane foam containing the silicone compound is used as the cushioning material of robots in production line of automobile bodies, released cyclic siloxane may form coating in automobile bodies, and may cause paint failure such as adhesion failure at the time of painting automobile bodies.

Therefore, recently, cushioning material containing no silicone compound has been demanded.

However, when urethane foam is produced without using the silicone-based foam stabilizer to exclude the silicone compound, cell is not stabilized while in the production process, and emulsification of the ingredient components are hindered, and therefore design failure such as voids and underfilling may be caused in the urethane foam. Furthermore, it was found that in such a case, mechanical properties such as balance between wear resistance and tear strength were not sufficient. Furthermore, depending on use of the cushioning material, it may be exposed to light, and therefore excellent light resistance may be required.

Another thing to be examined in such a cushioning material is that providing a resin coating layer on the surface of the urethane foam to improve design failure such as voids and underfilling.

However, with such a cushioning material, there may be a case where various physical properties such as mechanical properties, designability, durability (light resistance, abrasion resistance, etc.), and touch are poor depending on physical properties (flexibility, etc.) of urethane foam and resin coating layer.

An object of the present invention is to provide a buffer material containing essentially no silicone compound, and having excellent physical properties originally belong to foam such as mechanical properties, designability, durability (light resistance, abrasion resistance, etc.), and touch; a buffer material for coating robot, and a robot-with-buffer material including the buffer material, and furthermore, a coating robot-with-buffer material including the buffer material for coating robot.

Means for Solving the Problem

The present invention includes the following:

[1] a buffer material including skinned polyurethane foam including a foam layer and a skin layer formed on the surface of the foam layer, wherein the skinned polyurethane foam essentially contains no silicone compound; the foam layer is polyurethane foam produced by reaction of a foaming-isocyanate component with a foaming-active hydrogen group-containing component; the skin layer is a polyurethane resin layer produced by reaction of a skin-isocyanate component containing an aliphatic polyisocyanate and/or an alicyclic polyisocyanate with a skin-active hydrogen group-containing component; the skin layer has a storage modulus at 23° C. ($E'_{coat}$) of $1 \times 10$ Pa or more and $3 \times 10^8$ Pa or less; the foam layer has a storage modulus at 23° C. ($E'_{foam}$) of $1 \times 10$ Pa or more and $5 \times 10^6$ Pa or less, and the ratio of the storage modulus at 23° C. of skin layer ($E'_{coat}$) relative to the storage modulus at 23° C. ($E'_{foam}$) of foam layer ($E'/E'_{foam}$) is 10 or more and 500 or less,

[2] the buffer material of [1] above, wherein the skin layer has a thickness of 45 m or more and 1000 pin or less,

[3] the buffer material of [1] or [2] above, wherein the skinned polyurethane foam has a core density of 100 kg/m$^3$ or more and 500 kg/m$^3$ or less,

[4] the buffer material of any one of [1] to [3] above, wherein the foaming-active hydrogen group-containing component has an average functionality of 2.5 or more and 4.0 or less, and an average hydroxyl number of 20 mg KOH/g or more and 70 mg KOH/g or less,

[5] a buffer material for coating robot, the buffer material being any one of [1] to [4] above, and is used for a coating robot,

[6] a robot-with-buffer material including the buffer material of any one of [1] to [4] above and a robot,

[7] a coating robot-with-buffer material including the buffer material for coating robot of [5] above and a coating robot.

Effects of the Invention

In the buffer material and the buffer material for coating robot of the present invention, the skinned polyurethane foam contains essentially no silicone compound, the skin layer is obtained by using a skin-isocyanate component including an aliphatic polyisocyanate and/or an alicyclic polyisocyanate, the skin layer has a storage modulus within the above range, the foam layer has a storage modulus within the above range, and their ratio is within the above range, and therefore have excellent physical properties such as mechanical properties, designability, durability (light resistance, abrasion resistance, etc.), and touch.

The robot-with-buffer material and coating robot-with-buffer material of the present invention include the above-described buffer material or buffer material for coating robot, and therefore has excellent shock-absorbance and can be suitably used in various industrial fields.

DESCRIPTION OF EMBODIMENTS

Figure 1:
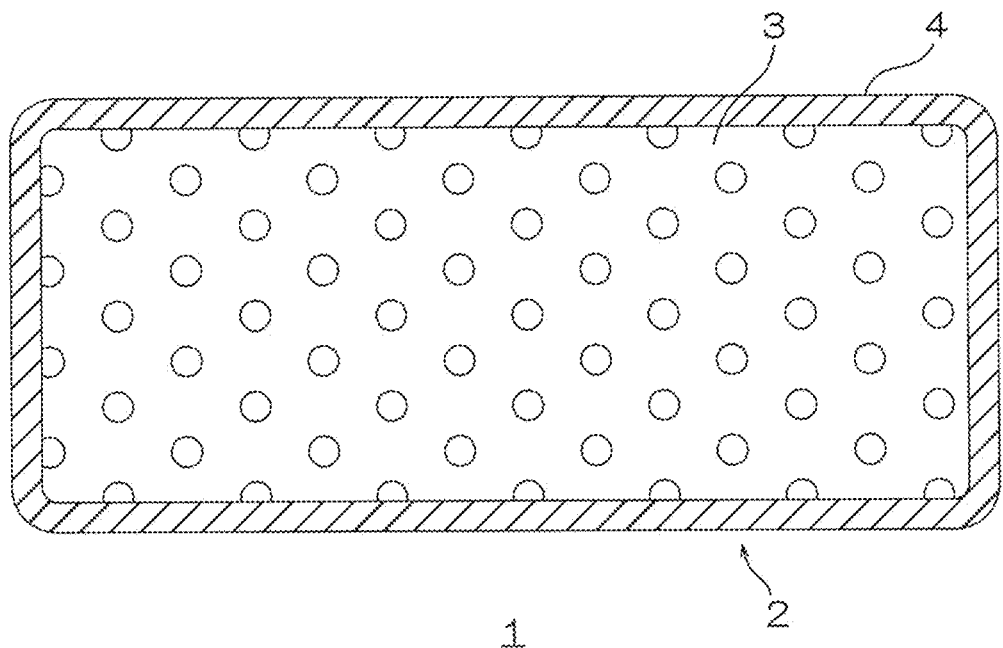
FIG. 1 is a schematic diagram illustrating the configuration of the buffer material in an embodiment of the present invention.

In FIG. 1, a buffer material 1 is composed of a skinned polyurethane foam 2 (i.e., polyurethane foam with skin) including a foam layer 3 and a skin layer 4 formed on the surface of the foam layer 3, and containing essentially no silicone compound. Essentially means that the silicone compound content is allowed to the extent that does not hinder excellent effects of the present invention. In this regard, the silicone compound relative to the polyurethane foam 2 is preferably 500 ppm or less, more preferably 300 ppm or less, further preferably 100 ppm or less, particularly preferably 50 ppm or less.

In the skinned polyurethane foam 2, the foam layer 3 is polyurethane foam (that is, portion excluding the skin layer 4 from the skinned polyurethane foam 2) having no skin, and is produced by reaction of the foaming-isocyanate component (i.e., isocyanate component for foaming) with the foaming-active hydrogen group-containing component (i.e., active hydrogen group-containing component for foaming).

To be more specific, the foam layer 3 can be produced by first mixing the foaming-isocyanate component with the foaming-active hydrogen group-containing component (premix to be described later, etc.) to prepare a polyurethane composition, and then allowing the polyurethane composition to foam in, for example, a mold in predetermined shape.

Examples of the foaming-isocyanate component include a polyisocyanate monomer, a polyisocyanate derivative, and an isocyanate group-terminated prepolymer.

Examples of the polyisocyanate monomer include aromatic polyisocyanate, araliphatic polyisocyanate, aliphatic polyisocyanate, and alicyclic polyisocyanate.

Examples of the aromatic polyisocyanate include aromatic diisocyanates such as tolylene diisocyanate (2,4- or 2,6-tolylene diisocyanate or a mixture thereof) (TDI), phenylenediisocyanate (m-, p-phenylenediisocyanate or a mixture thereof), 4,4'-diphenyl diisocvanate, 1,5-naphthalene diisocyanate (NDI), diphenylmethanediisocyanate (4,4'-, 2,4'- or 2,2'-diphenylmethanediisocyanate or a mixture thereof) (MDI), 4,4'-toluidine diisocyanate (TODI), and 4,4'-diphenylether diisocyanate.

Examples of the araliphatic polyisocyanate include araliphatic diisocyanates such as xylylene diisocyanate (1,3- or 1,4-xylylene diisocyanate or a mixture thereof) (XDI), tetramethylxylylene diisocvanate (1,3- or 1,4-tetramethylxylylene diisocyanate or a mixture thereof) (TMXDI), and ω,ω'-diisocyanate-1,4-diethylbenzene.

Examples of the aliphatic polyisocyanate include aliphatic diisocyanates such as ethylenediisocyanate, trimethylenediisocyanate, 1,2-propylenediisocyanate, butylenediisocyanate (tetramethylenediisocyanate, 1,2-butylenediisocyanate, 2,3-butylenediisocyanate, 1,3-butylenediisocyanate), 1,5-pentamethylenediisocyanate (PDI), 1,6-hexamethylenediisocyanate (HDI), 2,4,4- or 2,2,4-trimethylhexamethylenediisocyanate, 2,6-diisocyanatemethylcaproate, and dodecamethylenediisocyanate.

Examples of the alicyclic polyisocyanate include alicyclic diisocyanates such as 1,3-cyclopentanediisocyanate, 1,3-cyclopentene diisocyanate, cyclohexanediisocyanate (1,4-cyclohexanediisocyanate, 1,3-cyclohexanediisocyanate), 3-isocyanatomethyl-3,5,5-trimethylcyclohexyl isocyanate (isophoron diisocyanate) (IPDI), methylenebis(cyclohexyl isocyanate) (4,4'-, 2,4'- or 2,2'-methylenebis(cyclohexyl isocyanate, their trans,trans-isomers, trans,cis-isomers, cis,cis-isomers, or a mixture thereof)) ($H_{12}$MDI), methylcyclohexanediisocyanate (methyl-2,4-cyclohexanediisocyanate, methyl-2,6-cyclohexanediisocyanate), bis(isocyanatomethyl) norbomane (norbomanediisocyanate, various isomers or a mixture thereof) (NBDI), bis(isocyanatomethyl) cyclohexane (1,3- or 1,4-bis(isocyanatomethyl) cyclohexane or a mixture thereof) ($H_6$XDI).

These polyisocyanate monomers may be used singly or in a combination of two or more.

Examples of the polyisocyanate derivative include multimers of the above-described polyisocyanate monomer (for example, dimer, trimer (for example, isocyanurate-modified product, iminooxadiazinedione-modified product), pentamer, heptamer, etc.), allophanate-modified product (for example, allophanate-modified product produced by reaction of the above-described polyisocyanate monomer with low-molecular-weight polyol to be described later, etc.), polyol modified product (for example, polyol modified product (alcohol adduct) produced by reaction of the above-described polyisocyanate monomer with low-molecular-weight polyol to be described later, etc.), biuret-modified product (for example, biuret-modified product produced by reaction of the above-described polyisocyanate monomer with water or amines, etc.), urea-modified product (for example, urea-modified product produced by reaction of the above-described polyisocyanate monomer with diamine, etc.), oxadiazinetrione-modified product (for example, oxadiazinetrione produced by reaction of the above-described polyisocyanate monomer with carbon dioxide, etc.), carbodiimide-modified product (carbodiimide-modified product produced by decarboxylation condensation reaction of the above-described polyisocyanate monomer, etc.), uretdione-modified product, and uretonimine-modified product.

Examples of the polyisocyanate derivative also include polymethylenepolyphenylene polyisocyanate (crude MDI, polymeric MDI).

These polyisocyanate derivatives may be used singly or in a combination of two or more.

The isocyanate group-terminated prepolymer (isocyanate group-terminated prepolymer as foaming-isocyanate component) is a urethane prepolymer having at least two isocyanate groups at its molecular terminal, and can be obtained by urethane-forming reaction of polyisocyanate (polyisocyanate selected from polyisocyanate monomer, polyisocyanate derivative, and isocyanate group-terminated prepolymer, preferably polyisocyanate selected from polyisocyanate monomer and polyisocyanate derivative), with high-molecular weight polyol to be described later (and as necessary low-molecular-weight polyol) (hereinafter referred to as polyol) at such a ratio that the equivalent ratio (NCO/OH) of polyisocyanate relative to hydroxyl group of polyol is more than 1, preferably 1.5 to 100.

The urethane-forming reaction can be performed in accordance with a known method. The reaction temperature in the urethane-forming reaction is, for example, 50 to 120° C., preferably 50 to 100° C., and reaction time is, for example, 0.5 to 15 hours, preferably 1 to 10 hours.

In this reaction, as necessary, an organic solvent can be added.

Examples of the organic solvent include ketones such as acetone, methyl ethyl ketone, methylisobutylketone, and cyclohexanone; nitriles such as acetonitrile; alkylesters such as methyl acetate, ethyl acetate, butyl acetate, and isobutyl acetate; aliphatic hydrocarbons such as n-hexane, n-heptane, and octane; alicyclic hydrocarbons such as cyclohexane and methylcyclohexane; aromatic hydrocarbons such as toluene, xylene, and ethylbenzene; glycolether esters such as methylcellosolveacetate, ethylcellosolveacetate, methylcarbitolacetate, ethylcarbitolacetate, ethylene glycol ethylether acetate, propylene glycol methylether acetate, 3-methyl-3-methoxybutylacetate, and ethyl-3-ethoxypropionate; ethers such as diethylether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic solvents such as N-methylpyrrolidone, N,N'-dimethylformamide, N,N'-dimethylacetamide, dimethyl sulfoxide, and hexamethylphosphonylamide.

Furthermore, in the above reaction, as necessary, for example, a known urethane-forming catalyst such as amines and organic metal compounds can be added.

Examples of the amines (amine catalyst) include triethylamine, tripropylamine, polyisopropanolamine, tributylamine, trioctylamine, hexamethyldimethylamine, N-methylmorpholine, N-ethylmorpholine, N-octadecylmorpholine, monoethanolamine, diethanolamine, triethanolamine, N-methyldiethanolamine, N,N-dimethylethanolamine, diethylenetriamine, N,N,N',N'-tetramethylethylenediamine, N,N,N',N'-tetramethylpropylene diamine, N,N,N',N"-tetramethylbutanediamine, N,N,N',N'-tetramethyl-1,3-butanediamine. N,N,N',N'-tetramethylhexamethylenediamine, bis [2-(N,N-dimethylamino) ethyl]ether, N,N-dimethylbenzvlamine, N,N-dimethylcyclohexylamine, N,N,N',N'-pentamethyldiethylenetriamine, triethylenediamine, formate of triethylenediamine and other salts, oxyalkylene adduct of amino group of primary and secondary amines, aza-cyclic compound such as N,N-dialkylpiperazines, various N,N',N"-trialkylaminoalkylhexahydrotriazines, and furthermore, for example, quatemary ammonium salt compounds such as tetraethyl hydroxyl ammonium, and imidazole compounds such as imidazole and 2-ethyl-4-methylimidazole.

Examples of the organometallic compound include organotin compounds such as tin acetate, tin octylate (stannous octoate, etc.), tin oleate, tin laurate, dibutyl tin diacetate, dimethyl tin dilaurate, dibutyl tin dilaurate, dibutyl tin dimercaptide, dibutyl tin maleate, dibutyl tin dilaurate, dibutyl tin dineodecanoate, dioctyl tin dimercaptide, dioctyl tin dilaurylate, and dibutyl tin dichloride; organic lead compounds such as lead octanoate and lead naphthenate; organic nickel compounds such as nickel naphthenate; organic cobalt compounds such as cobalt naphthenate; organocopper compounds such as octenate copper; organic bismuth compounds such as bismuth octylate and bismuth neodecanoate; organic zirconium compounds such as zirconium acetylacetonechelate; organic titanium compounds such as titanium acetoacetic acidchelate and bis(2-ethylhexanoic acid) titanium; and organic iron compounds such as iron acetylacetonechelate.

Examples of the urethane-forming catalyst also include potassium salts such as potassium carbonate, potassium acetate, and potassium octoate.

These urethane-forming catalysts may be used singly or in a combination of two or more.

Furthermore, in this reaction, as necessary, free (unreacted) polyisocyanate and organic solvent can be removed from the isocyanate group-terminated prepolymer by a known removal method such as distillation or extraction.

The isocyanate group-terminated prepolymer has an isocyanate group content (isocyanate group content, NCO %) of, for example, 10 mass % or more, preferably 20 mass % or more, and for example, 28 mass % or less, preferably 26 mass % or less.

The isocyanate group content can be determined by a known method such as titration with di-n-butylamine and FT-IR analysis (the same applies in the following).

When the isocyanate group content is within the above-described range, storage stability of the isocyanate group-terminated prepolymer can be improved, and generation of void and underfilling in the foam layer 3 to be obtained can be suppressed.

These foaming-polyisocyanate components may be used singly or in a combination of two or more.

For the foaming-polyisocyanate component, preferably, an isocyanate group-terminated prepolymer is used, more preferably, isocyanate group-terminated prepolymers produced by reaction of aromatic polyisocyanate and/or derivative thereof with high-molecular weight polyol (described later), even more preferably, isocyanate group-terminated prepolymer produced by the reaction of diphenylmethanediisocyanate and derivative thereof with polyetherpolyol (described later); and particularly preferably, isocyanate group-terminated prepolymer produced by reaction of diphenylmethanediisocyanate (monomer), polymethylenepolyphenylenepolyisocyanate, and polyoxyalkylene (C2 to 3) polyol (described later) is used.

In such a case, for the diphenylmethane diisocyanate (monomer), preferably, a mixture of 4,4'-diphenylmethanediisocyanate and 2,4'-diphenylmethanediisocyanate is used.

4,4'-diphenylmethanediisocyanate is mixed with 2,4'-diphenylmethanediisocyanate at such a ratio that relative to 100 parts by mass of their total, 4,4'-diphenylmethanediisocyanate is, for example, 10 parts by mass or more, preferably 20 parts by mass or more, and for example, 60 parts by mass or less, preferably 50 parts by mass or less. 2,4'-diphenylmethanediisocyanate is, for example, 40 parts by mass or more, preferably 50 parts by mass or more, and for example, 90 parts by mass or less, preferably 80 parts by mass or less.

Diphenylmethane diisocyanate (monomer) is mixed with polymethylenepolyphenylenepolyisocyanate at such a ratio that, relative to 100 parts by mass of their total, diphenylmethane diisocyanate (monomer) is, for example, 40 parts by mass or more, preferably 50 parts by mass or more, and for example, 90 parts by mass or less, preferably 80 parts by mass or less. Polymethylenepolyphenylenepolyisocyanate is, for example, 10 parts by mass or more, preferably 20 parts by mass or more, and for example, 60 parts by mass or less, preferably 50 parts by mass or less.

Use of such a foaming-polyisocyanate component allows for production of the foam layer 3 with excellent mechanical properties.

The foaming-active hydrogen group-containing component is a component used for forming the foam layer 3, and has an active hydrogen group (hydroxyl group, amino group, etc.). Examples thereof include foaming-polyol components.

Examples of the foaming-polyol component include high-molecular weight polyols and low-molecular-weight polyols.

The high-molecular weight polyol is a compound having two or more hydroxyl groups and having a number average molecular weight of 400 or more and 10,000 or less. Examples thereof include polyether polyol, polyester polyol, polyesteramide polyol, polycarbonate polyol, polyurethane polyol, epoxy polyol, vegetable oil polyol, polyolefin polyol, acrylic polyol, and vinyl monomer-modified polyol.

Examples of the polyether polyol include polyoxyalkylene (number of carbon atoms (C) 2 to 3) polyol, and polytetramethylene ether glycol.

Polyoxyalkylene (C2 to 3) polyol is polyoxyalkylene polyol in which alkylene oxide has 2 to 3 carbon atoms, and examples thereof include addition polymerization product (including random and/or block copolymer of two or more types of alkylene oxides) of alkylene oxides such as ethylene oxide and propylene oxide using a low-molecular-weight polyol (described later) or low-molecular-weight amine as an initiator.

That is, for polyoxyalkylene (C2 to 3) polyol, to be specific, polyoxyethylene polyol, polyoxypropylene polyol, and random and/or block copolymer of polyoxyethylene and polyoxypropylene are used.

Production method of such polyoxyalkylene polyol is not particularly limited, and can be produced by subjecting the above-described materials to polymerization reaction under a presence of a known catalyst. For the catalyst, preferably, a catalyst with less alkylene oxide side reaction is used. To be specific, for example, a known phosphazene catalyst, and a double metal cyanide complex catalyst are used.

For the alkylene oxide side reaction indicator, total degree of unsaturation of polyoxyalkylene polyol is used. Polyoxyalkylene polyol has a total degree of unsaturation of, for example, 0.1 meq./g or less, preferably 0.07 meq./g or less, more preferably 0.05 meq./g or less, even more preferably 0.04 meq./g or less, and for example, 0.001 meq./g or more.

Polyoxyalkylene (C2 to 3) polyol includes polytrimethyleneether glycol. Examples of the polytrimethyleneether glycol include polyol produced from polycondensation of plant derived 1,3-propanediol.

Examples of the polytetramethylene ether glycol include ring-opening polymerization product produced by cationic polymerization of tetrahydrofuran, and noncrystalline polytetramethylene ether glycol obtained by copolymerizing polymerization unit of tetrahydrofuran and dihydric alcohol described later.

Furthermore, plant derived polytetramethylene ether glycol using tetrahydrofuran as a starting material produced from a plant derived material such as furfural can also be used.

Examples of the polyesterpolyol include a polycondensate produced by subjecting the low-molecular-weight polyol (preferably, dihydric alcohol) to be described later to esterification reaction with polybasic acid under known conditions.

Examples of the polybasic acid include saturated aliphatic dicarboxylic acids such as oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, sebacic acid, saturated aliphatic dicarboxylic acids (C11 to 13), etc.; unsaturated aliphatic dicarboxylic acids such as maleic acid, fumaric acid, itaconic acid, etc.; aromatic dicarboxylic acids such as orthophthalic acid, isophthalic acid, terephthalic acid, toluenedicarboxylic acid, naphthalenedicarboxylic acid, etc.; alicyclic dicarboxylic acids such as hexahydrophthalic acid, etc.; other carboxylic acids such as dimer acid, hydrogenated dimer acid, het acid, etc. and acid anhydrides derived from these carboxylic acids such as oxalic anhydride, succinic anhydride, maleic anhydride, phthalic anhydride, 2-alkyl (C12 to C 18) succinic anhydride, tetrahydrophthalic anhydride, trimellitic anhydride, and hallides derived from carboxylic acids thereof such as oxalyl dichloride, adipoyl dichloride, and sebacoyl dichloride.

Examples of the polyester polyol include vegetable oil polyester polyols obtained by condensation reaction of hydroxycarboxylic acid such as hydroxyl group-containing vegetable oil fatty acid (e.g., castor oil fatty acid containing ricinoleic acid, hydrogenated castor oil fatty acid containing 12-hydroxystearic acid, etc.) with the low-molecular-weight polyol to be described later under known conditions.

Examples of the polyester polyol further include lactone-based polyester polyols such as polycaprolactone polyol and polyvalerolactone polyol obtained by ring-opening polymerization of lactones such as ε-caprolactone, γ-valerolactone, etc. using the low-molecular-weight polyols (preferably, dihydric alcohol) to be described later as an initiator; and copolymer of a polycaprolactone polyol or polyvalerolactone polyol with dihydric alcohol to be described later.

Examples of the polyester amide polyol include polyester amide polyols obtained by using low molecular weight polyamine (for example, ethylenediamine, propylene diamine, hexamethylenediamine, etc.) as a material in combination in the esterification reaction of the polyester polyols mentioned above.

Examples of the polycarbonatepolyol include polycarbonatediol such as a ring-opening polymerization product of ethylenecarbonate using the low-molecular-weight polyol (preferably, dihydric alcohol) to be described later as an initiator, and noncrystalline polycarbonatepolyol produced by copolymerizing a ring-opening polymerization product with dihydric alcohols such as 1,4-butanediol, 1,5-pentanediol, 3-methyl-1,5-pentanediol, and 1,6-hexanediol.

Polyurethane polyols can be obtained as polyester polyurethane polyol, polyether polyurethane polyol, polycarbonate polyurethane polyol, or polyester polyether polyurethane polyol, by allowing, polyether polyol, polyester polyol, and/or polycarbonate polyol obtained as described above to react with a known polyisocyanate compound (for example, the above-described foaming-isocyanate component) at an equivalent ratio (OH/NCO) of hydroxyl group to isocyanate group of more than 1.

Examples of the epoxy polyol include epoxy polyol obtained by a reaction between the low-molecular-weight polyol to be described later and a polyfunctional halohydrin such as epichlorohydrin and β-methyl epichlorohydrin.

Examples of the vegetable oil polyol include hydroxyl group-containing vegetable oil such as castor oil and coconut oil. Examples thereof include castor oil polyol or ester-modified castor oil polyol obtained by reaction of castor oil polyol with polypropylene polyol.

Examples of the polyolefin polyol (polyhydroxyalkane) include polybutadiene polyol and partially saponified ethylene-vinylacetate copolymer.

Examples of the acrylic polyol include copolymers obtained by copolymerizing hydroxyl group-containing (meth)acrylate with a copolymerizable vinyl monomer copolymerizable with the hydroxyl group-containing (meth) acrylate.

Examples of the hydroxyl group-containing (meth)acrylate include 2-hydroxyethyl (meth)acrylate, hydroxypropyl (meth)acrylate, hydroxybutyl (meth)acrylate, 2,2-dihydroxymethylbutyl (meth)acrylate, polyhydroxyalkyl-maleate, and polyhydroxyalkylfumarate. Preferably, 2-hydroxyethyl (meth)acrylate is used.

Examples of the copolymerizable vinyl monomer include alkyl (meth)acrylates (of 1 to 12 carbon atoms) such as methyl (meth)acrylate, ethyl (meth)acrylate, propyl (meth) acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, isononyl (meth)acrylate, 2-ethylhexyl (meth)acrylate, cyclohexyl acrylate, and isobornyl (meth)acrylate; aromatic vinyl monomers such as styrene, vinyltoluene, and α-methylstyrene; vinyl cyanides such as (meth) acrylonitrile; vinyl monomers containing carboxyl groups such as (meth) acrylic acid, fumaric acid, maleic acid, and itaconic acid, or alkyl esters thereof; alkane polyol poly (meth)acrylates such as ethylene glycol di(meth)acrylate, butylene glycol di(meth)acrylate, hexanediol di(meth) acrylate, oligo-ethylene glycol di(meth)acrylate, trimethylol propane di(meth)acrylate, and trimethylol propane tri(meth) acrylate; and vinyl monomers containing isocyanate groups such as 3-(2-isocyanato-2-propyl)-α-methylstyrene.

The acrylic polyol can be obtained by copolymerizing these hydroxyl group-containing (meth)acrylates and copolymerizable vinyl monomers in the presence of a suitable solvent and a suitable polymerization initiator.

Examples of acrylic polyol also include fluorine polyol.

Examples of the fluorine-containing polyol include acrylic polyol in which, as a copolymerizable vinyl monomer, a fluorine-containing compound containing a vinyl group such as tetrafluoroethylene or chlorotrifluoroethylene is blended in the copolymerization of the acrylic polyol.

The vinyl monomer-modified polyol can be obtained by a reaction between the above-mentioned high-molecular-weight polyol and a vinyl monomer. For the high-molecular weight polyol, preferably, a high-molecular weight polyol selected from polyetherpolyol, polyester polyol, and polycarbonate polyol is used.

Examples of the vinyl monomer include the above-described alkyl (meth) acrylate, vinyl cyanide, and vinylidene cyanide. These vinyl monomers may be used singly or in a combination of two or more. Of these, preferably, alkyl (meth)acrylate is used.

The vinyl monomer-modified polyol can be obtained by allowing these high-molecular-weight polyols and vinyl monomers to react in the presence of a radical polymerization initiator (e.g., persulfate, organic peroxide, azo compound, etc.) and the like.

These high-molecular weight polyols may be used singly or in a combination of two or more.

The low-molecular-weight polyol is a compound having two or more hydroxyl groups and having a number average molecular weight of 60 or more and less than 400, and examples thereof include dihydric alcohols such as ethylene glycol, propylene glycol, 1,3-propanediol, 1,4-butyleneglycol, 1,3-butyleneglycol, 1,2-butyleneglycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerin, trimethylolpropane, and triisopropanolamine; tetrahydric alcohols such as tetramethylolmethane (pentaerythritol) and diglycerin; pentahydric alcohols such as xylitol; hexahydric alcohols such as sorbitol, mannitol, allitol, iditol, dulcitol, altritol, inositol, and dipentaerythritol; heptahydric alcohols such as perseitol; and octahydric alcohols such as sucrose.

These low-molecular-weight polyols may be used singly or in a combination of two or more.

For the foaming-active hydrogen group-containing component, preferably, high-molecular weight polyol is used, more preferably, polyetherpolyol is used.

The foaming-active hydrogen group-containing component has an average functionality of, for example, 2 or more, preferably 2.5 or more, more preferably 2.8 or more, and for example, 6 or less, preferably 4.5 or less, more preferably 4.0 or less, more preferably 3.5 or less.

When the foaming-active hydrogen group-containing component has an average functionality within the above-described range, a foam layer 3 with mechanical properties, particularly both tear strength and shock absorbing characteristics can be produced. Meanwhile, when the average functionality is below the above-described lower limit, tear strength may not be sufficient, and when the average functionality is more than the above-described upper limit, shock absorbing characteristics may not be sufficient.

The average functionality of the foaming-active hydrogen group-containing component can be calculated from the materials charged.

The foaming-active hydrogen group-containing component has an average hydroxyl number of 20 mg KOH/g or more, preferably 24 mg KOH/g or more, and 200 mg KOH/g or less, preferably 70 mg KOH/g or less.

When the foaming-active hydrogen group-containing component has a hydroxyl number within the above-described range, a foam layer 3 with mechanical properties, particularly both tear strength and shock absorbing characteristics can be produced. Meanwhile, when the hydroxyl number is below the above-described lower limit, tear strength may not be sufficient, and when the hydroxyl number is more than the above-described upper limit, shock absorbing characteristics may not be sufficient.

The hydroxyl number can be determined from a known hydroxyl number measurement method such as acetylation method or phthalation method (in accordance with JIS K1557-1(2007)) (the same applies in the following).

For the foaming-active hydrogen group-containing component, preferably, a plurality of high-molecular weight polyols (more preferably, a plurality of polyether polyols) are used in combination, and the average functionality and the hydroxyl number are adjusted to be in the above-described range.

In such a case, the average functionality and the hydroxyl number of each of the high-molecular weight polyols (more preferably, polyetherpolyol), and ratios at which they are combined are not particularly limited, and the average functionality and the hydroxyl number of the foaming-active hydrogen group-containing component are suitably adjusted to be in the above-described range.

The polyurethane composition can further contain a catalyst and a blowing agent along with the foaming-isocyanate component and the foaming-active hydrogen group-containing component. Preferably, the polyurethane composition consists of the foaming-isocyanate component, foaming-active hydrogen group-containing component, catalyst, blowing agent, and an additive (described later) blended as necessary.

For the catalyst, a known catalyst generally used for production of polyurethane foam (foam layer 3) can be used. Examples of such a catalyst include the above-described urethane-forming catalyst, to be specific, the above-described amines, and the above-described organic metal compound are used.

The catalyst can be used singly, or a plurality of types of them can be used in combination.

When a plurality of types of catalysts are used, preferably, an amine catalyst and an organic metal catalyst are used in combination.

For the blowing agent, a known blowing agent generally used for production of polyurethane foam (foam layer 3) can be used. Examples of such a blowing agent include water, and halogen-substituted aliphatic hydrocarbons such as trichlorofluoromethane, dichlorodifluoromethane, trichloroethane, trichloroethylene, tetrachloroethylene, trans-1-chloro-3,3,3-trifluoropropene, 1,1,1-4,4,4-hexafluoro-2-butene, methylene chloride, trichlorotrifluoroethane, dibromotetrafluoroethane, and carbon tetrachloride.

These blowing agents can be used singly, or can be used in combination of two or more.

For the blowing agent, preferably, water is used singly.

The polyurethane composition can further contain a cross-linking agent, along with the foaming-isocyanate component and the foaming-active hydrogen group-containing component.

The cross-linking agent is blended to improve impact resilience of polyurethane foam (foam layer 3), and to adjust mold density of polyurethane foam (foam layer 3), and also increase in air flow and microsizing cells, and for example, alkanolamine is used.

Examples of the alkanolamine include polyalkanolamines such as trialkanolamines (tri C 2 to 4 alkanolamine) including trimethanolamine, triethanolamine, tripropanolamine, triisopropanolamine, and tributanolamine; and dialkanolamine (di C2 to 4 alkanolamine) including diethanolamines.

Examples of the cross-linking agent also include, other than the above-described alkanolamine, the above-described low-molecular-weight monol, the above-described low-molecular-weight polyol and/or its alkylene oxide-added polyol, quadrivalent aliphatic amine, aliphatic and alicyclic secondary diamine (to be specific, JEFFLINK 754 (manufactured by Huntsman), CLEARLINK 1000 (manufactured by Dorf Ketal Chemicals), CLEARLINK 3000 (manufactured by Dorf Ketal Chemicals), ETHACURE 90 (manufactured by ALBEMARLE)) can also be used.

These cross-linking agents can be used singly, or can be used in combination of two or more.

Preferably, the cross-linking agent is not used.

The polyurethane composition can further contain a cell opener, along with the foaming-isocyanate component and the foaming-active hydrogen group-containing component. Preferably, the polyurethane composition consists of the foaming-isocyanate component, foaming-active hydrogen group-containing component, catalyst, blowing agent, cell opener, and additives (described later) added as necessary.

Examples of the cell opener include polyetherpolyol, to be specific, polyetherpolyol (particularly, polyoxyalkylene polyol) having an average functionality of, for example, 1.5 or more, preferably 2 or more, and for example, 8 or less, preferably 6 or less, an oxyalkylene unit content of more than 50 mass %, preferably 60 mass % or more, more preferably 70 mass % or more, generally 95 mass % or less, a hydroxyl number of, for example, 20 mg KOH/g or more, preferably 35 mg KOH/g or more, and for example, 200 mg KOH/g or less, preferably 150 mg KOH/g or less.

When the polyoxyalkylene polyol is used, distinction is made as follows: the polyoxyalkylene polyol with an oxyalkylene unit content of more than 50 mass % is the cell opener, and polyoxyalkylene polyol with an oxyalkylene unit content of 50 mass % or less is the foaming-active hydrogen group-containing component.

When the cell opener is added, cell opening percentage of polyurethane foam (foam layer 3) can be improved, and air flow amount can be increased, and furthermore, excellent foam can be produced without using the silicone-based foam stabilizer.

The polyurethane composition does not contain the silicone compound such as a silicone-based foam stabilizer.

To be specific, conventionally, in production of polyurethane foam, silicone compounds such as the silicone-based foam stabilizer is blended in the polyurethane composition, and polyurethane foam to be produced contains silicone compounds.

However, polyurethane foam containing silicone compounds may release cyclic siloxane derived from silicone compounds, and therefore when polyurethane foam containing silicone compounds is used as a cushioning material of a robot in production line of electric and electronic components (semiconductor, etc.), released cyclic siloxane may form coating on the electric and electronic components (semiconductor, etc.), which may cause conductive failure.

Furthermore, when urethane foam containing silicone compounds is used as a cushioning material of a robot in production line of automobile bodies, released cyclic siloxane forms coating on automobile bodies, and paint failure such as adhesion failure may be caused when painting automobile bodies.

In contrast, in the present invention, even though the polyurethane composition does not contain silicone compounds such as the silicone-based foam stabilizers, polyurethane foam (foam layer 3) with desired physical properties can be produced.

The polyurethane composition may contain other additives (auxiliary agent) as necessary.

Examples of the other additives include known antioxidants, ultraviolet ray absorbers, light stabilizers, fire retardants, and coloring agents generally used in production of polyurethane foam.

Examples of the antioxidant include hindered phenol compounds (to be specific, IRGANOX 1135, IRGANOX 245, IRGANOX 1076, IRGANOX 1726, IRGANOX 1520 L, all manufactured by BASF, to be specific, ADK STAB AO-80 manufactured by ADEKA), organic phosphorus compounds (to be specific, JP-302, JP-308, JP-308E, JP-310, JP-312 L, JP-333E, JP-3180, JPS-312, JPP-13R, JP-318E, all manufactured by Johoku Chemical Co. Ltd., to be specific, IRGAFOS 38, IRGAFOS P-EPQ, all manufactured by BASF, to be specific, ADK STAB PEP-4C, ADK STAB PEP-8, ADK STAB 1500, ADK STAB 3010, all manufactured by manufactured by ADEKA), thioether compounds (to be specific, IRGANOX PS800FL, IRGANOX PS802FL, all manufactured by BASF, to be specific, ADK STAB AO-412S, ADK STAB AO-503, all manufactured by ADEKA, to be specific, Yoshitomi DLTP, Yoshitomi DSTP, and Yoshitomi DMTP, all manufactured by API CORPORATION), and hydroxylamine compounds (to be specific, IRGASTAB FS 042 manufactured by BASF).

Examples of the ultraviolet ray absorber include a benzotriazole compound (to be specific, TINUVIN 571, TINUVIN 213, TINUVIN 234, and TINUVIN P, all manufactured by BASF), a formamidine compound (to be specific, Zikasorb R, Zikasorb BS, ZIKA-FA02, ZIKA-FUA, ZIKA-FUV, ZIKA-UVS 3, and ZIKA-UVS 4, all manufactured by ZIKO).

Examples of the light stabilizer include a hindered amine compound (to be specific, TINUVIN 765, TINUVIN 770, and TINUVIN 622 LD, all manufactured by BASF, to be specific, ADK STAB LA-52, ADK STAB LA-57, ADK STAB LA-63P, ADK STAB LA-68, ADK STAB LA-72, ADK STAB LA-82, and ADK STAB LA-87, all manufactured by ADEKA).

Examples of the fire retardant include fire retarding organic phosphorus compound.

Examples of the fire retarding organic phosphorus compound include halogen-containing organic phosphorus compounds, non-halogen organic phosphorus compounds, and their oligomers.

Examples of the halogen-containing organic phosphorus compound and their oligomers include monophosphates such as tris(β-chloropropyl) phosphate (TCPP), tris (chloroethyl) phosphate (TCEP), and tris (dichloropropyl) phosphate (TDCP); and halogen-containing phosphoric acid ester oligomers such as 2,2-bis(chloromethyl)-1,3-propane-bis(chloroethyl) phosphate, and diethylene glycol bis(chloropropyl) phosphate.

Examples of the non-halogen organic phosphorus compound include aromatic phosphoric acid esters such as triphenylphosphate, tricresylphosphate, cresyldiphenylphosphate, and xylenyldiphenylphosphate; oligomer aromatic phosphoric acid ester such as resorcin bis(diphenylphosphate), bisphenol A bis(diphenyl phosphate), and bisphenol A bis(dicresylphosphate); aliphatic phosphoric acid esters such as triethylphosphate, and tributylphosphate; aromatic aliphatic-mixed phosphoric acid esters such as 2-ethylhexyldiphenylphosphate and decyldiphenylphosphate; and dimethylmethylphosphonate, diethylethylphosphonate and its oligomers.

These fire retardants may be used singly or in a combination of two or more.

Examples of the coloring agent include inorganic pigment such as aluminum flakes, copper bronze flakes, mica, titanium dioxide, iron oxide, chromium oxide, lead chromate, and carbon black; and organic pigment such as phthalocyanine blue, phthalocyanine green, and catechins.

These coloring agents may be used singly or in a combination of two or more.

The polyurethane composition has an isocyanate index (ratio of isocyanate group in foaming-isocyanate component relative to active hydrogen group in polyurethane composition multiplied by 100, NCO concentration/active hydrogen group concentration×100) of, for example, 75 or more, preferably 80 or more, more preferably 84 or more, and for example, 95 or less, preferably 90 or less, more preferably 88 or less.

When the isocyanate index is within the above-described range, a foam layer 3 with excellent mechanical properties and durability (light resistance, abrasion resistance, etc.) can be produced.

The mixing ratio of the components excluding the foaming-isocyanate component and the foaming-active hydrogen group-containing component is as follows. The catalyst is blended in an amount relative to 100 parts by mass of the foaming-active hydrogen group-containing component of, for example, 0.01 parts by mass or more, preferably 0.05 parts by mass or more, and for example, 5 parts by mass or less, preferably 2 parts by mass or less.

The blowing agent relative to 100 parts by mass of the foaming-active hydrogen group-containing component is, for example, 0.5 parts by mass or more, preferably 0.8 parts by mass or more, and for example, 4.5 parts by mass or less, preferably 3.5 parts by mass or less.

When the cross-linking agent is blended, the cross-linking agent is blended in an amount of, relative to 100 parts by mass of the foaming-active hydrogen group-containing component, for example, 0.1 parts by mass or more, preferably 0.3 parts by mass or more, more preferably 3 parts by mass or more, and for example, 20 parts by mass or less, preferably 10 parts by mass or less, more preferably 8 parts by mass or less.

When the cell opener is blended, the cell opener is blended in an amount of, relative to 100 parts by mass of the foaming-active hydrogen group-containing component, for example, 1 part by mass or more, preferably 1.2 parts by mass or more, and for example, 10 parts by mass or less, preferably 5 parts by mass or less.

When the foam stabilizer, antioxidant, ultraviolet ray absorber, and light stabilizer are blended, they are each blended in an amount of, relative to 100 parts by mass of the foaming-active hydrogen group-containing component, for example, 0.1 parts by mass or more, preferably 0.2 parts by mass or more, and for example, 5 parts by mass or less, preferably 2 parts by mass.

When the fire retardant is blended, the fire retardant is blended in an amount of, relative to 100 parts by mass of the foaming-active hydrogen group-containing component, for example, 5 parts by mass or more, preferably 10 parts by mass or more, and for example, 40 parts by mass or less, preferably 30 parts by mass or less.

When the coloring agent is blended, the coloring agent is blended in an amount of, relative to 100 parts by mass of the foaming-active hydrogen group-containing component, for example, 0.5 parts by mass or more, preferably 1 part by mass or more, and for example, 10 parts by mass or less, preferably 5 parts by mass or less.

The polyurethane composition is prepared by, for example, a known method such as one-shot process, and prepolymer process.

In one-shot process, for example, the above-described components are blended at once, and mixed by stirring.

In one-shot process, first, the components other than the foaming-isocyanate component are blended, and they are mixed by stirring to prepare a premix. Thereafter, the prepared premix is blended with the foaming-isocyanate component so that the above-described isocyanate index is achieved, and they are mixed by stirring, thereby preparing a polyurethane composition.

Meanwhile, in prepolymer process, for example, the foaming-isocyanate component is blended (charged) with a portion of the foaming-active hydrogen group-containing component and as necessary the cross-linking agent, and they are allowed to react to prepare an isocyanate group-terminated prepolymer (isocyanate group-terminated prepolymer to form the foam layer 3). To be specific, the foaming-isocyanate component is blended with the foaming-active hydrogen group-containing component so that the isocyanate group content (amount of isocyanate group present in prepolymer represented by mass percent, can be measured in accordance with JIS K 1603-1(2007) method A) is, for example, 5 to 43 mass %, preferably 10 to 38 mass %.

Thereafter, the isocyanate group-terminated prepolymer is blended with the remaining portion of the foaming-active hydrogen group-containing component and as necessary the cross-linking agent, and the component other than the above-described components (to be specific, catalyst, blowing agent, and as necessary foam stabilizer and other additives, and they are allowed to react to prepare a polyurethane composition.

In this method, the polyurethane composition is allowed to foam by a known foaming method such as, for example, slab method, mold method, spray method, or mechanical frothing. The foam layer 3 is produced in this manner.

The foam layer 3 has a storage modulus at 23° C. ($E'_{foam}$) of, $1 \times 10^5$ Pa or more, preferably $3 \times 10^5$ Pa or more, more preferably $5 \times 10^5$ Pa or more, more preferably $7 \times 10^5$ Pa or more, and $5 \times 10^6$ Pa or less, preferably $4.5 \times 10^6$ Pa or less, more preferably $4 \times 10^6$ Pa or less, more preferably $3 \times 10^6$ Pa or less, particularly preferably $1 \times 10^6$ Pa or less.

When the foam layer 3 has a storage modulus at 23° C. ($E'_{foam}$) within the above-described range, a buffer material 1 (skinned polyurethane foam 2) with excellent physical properties such as mechanical properties, designability, durability (light resistance, abrasion resistance, etc.), and touch can be produced. In particular, when the foam layer 3 has a storage modulus at 23° C. ($E'_{foam}$) within the above-described range, there is tendency that excellent balance between hardness (shock resistance) and tear strength can be achieved. This is probably synergy effects with the skin layer 4 having storage modulus ($E'_{coat}$) in a specific range to be described later. For example, the storage modulus within the above-described range would allow the tear strength of the buffer material 1 to be easily dominated by the skin layer 4 to be described later.

The storage modulus is a value measured at 23° C. of temperature dependency of dynamic viscoelasticity (1 rad/s (10 Hz)), and can be measured in accordance with Examples to be described later (the same applies in the following).

The foam layer 3 has a mold density of, for example, 70 g/cm³ or more, preferably 100 g/cm³ or more, more preferably 120 g/cm³ or more, and for example, 500 g/cm³ or less, preferably 400 g/cm³ or less, more preferably 300 g/cm³ or less, more preferably 200 g/cm³ or less.

When the mold density is within the above-described range, a buffer material with excellent physical properties such as mechanical properties, designability, durability (light resistance, abrasion resistance, etc.), and touch can be produced.

In the skinned polyurethane foam 2, the skin layer 4 is a polyurethane resin layer coating the entire surface of the foam layer 3, and is produced by allowing a skin-isocyanate component (i.e., isocyanate component for skin) to react with a skin-active hydrogen group-containing component (i.e., active hydrogen group-containing component for skin).

That is, the skin layer 4 can be produced by allowing at least the skin-isocyanate component and the skin-active hydrogen group-containing component to react.

The skin-isocyanate component contains, as essential components, aliphatic polyisocyanate and/or alicyclic polyisocyanate.

Examples of the aliphatic polyisocyanate include the above-described aliphatic polyisocyanate, and to be specific, for example, aliphatic diisocyanates such as ethylenediisocyanate, trimethylenediisocyanate, 1,2-propylenediisocyanate, butylenediisocyanate (tetramethylenediisocyanate, 1,2-butylenediisocyanate, 2,3-butylenediisocyanate, 1,3-butylenediisocyanate), 1,5-pentamethylenediisocyanate (PDI), 1,6-hexamethylenediisocyanate (HDI), 2,4,4- or 2,2,4-trimethylhexamethylenediisocyanate, 2,6-diisocyanatomethylcaproate, and dodecamethylenediisocyanate are used.

Examples of the alicyclic polyisocyanate include the above-described alicyclic polyisocyanate, and to be specific, for example, alicyclic diisocyanates such as 1,3-cyclopentanediisocyanate, 1,3-cyclopentene diisocyanate, cyclohexanediisocyanate (1,4-cyclohexanediisocyanate, 1,3-cyclohexanediisocyanate), 3-isocyanatomethyl-3,5,5-trimethylcyclohexyl isocyanate (isophoron diisocvanate) (IPDI), methylenebis(cyclohexyl isocyanate) (4,4'-, 2,4'- or 2,2'-methylenebis(cyclohexyl isocyanate, their trans,trans-isomers, trans,cis-isomers, cis,cis-isomers, or a mixture thereof)) ($H_{12}MDI$), methylcyclohexanediisocyanate (methyl-2,4-cyclohexanediisocyanate, methyl-2,6-cyclohexanediisocyanate), bis(isocyanatomethyl) norbomane (norbomanediisocyanate, various isomers or a mixture thereof) (NBDI), and bis(isocyanatomethyl) cyclohexane (1,3- or 1,4-bis(isocyanatomethyl) cyclohexane or a mixture thereof) ($H_6XDI$) are used.

Examples of the aliphatic polyisocyanate and/or alicyclic polyisocyanate also include derivatives of aliphatic polyisocyanate and/or alicyclic polyisocyanate.

Examples of the derivative of aliphatic polyisocyanate and/or alicyclic polyisocyanate include the above-described derivatives of polyisocyanate derivative, and to be specific, for example, multimer, allophanate-modified product, polyol modified product, biuret-modified product, urea-modified product, oxadiazinetrione-modified product, carbodiimide-modified product, uretdione-modified product, and uretonimine-modified product of aliphatic polyisocyanate and/or alicyclic polyisocyanate are used.

These aliphatic polyisocyanate and/or alicyclic polyisocyanates may be used singly or in a combination of two or more.

For the aliphatic polyisocyanate and/or alicyclic polyisocyanate, preferably, bis(isocyanatomethyl) cyclohexane, methylenebis(cyclohexyl isocyanate), hexamethylenediisocyanate, and their derivatives are used.

For the aliphatic polyisocyanate and/or alicyclic polyisocyanate, preferably, alicyclic polyisocyanate is used, more preferably, isophoron diisocyanate, bis(isocyanatomethyl) cyclohexane, methylenebis(cyclohexyl isocyanate) are used, even more preferably, bis(isocyanatomethyl) cyclohexane and methylenebis(cyclohexyl isocyanate) are used.

The skin-isocyanate component can contain, as an optional component, the above-described aromatic polyisocyanate as the foaming-isocyanate component, and the above-described aralkyl polyisocyanate as the foaming-isocyanate component. In such a case, the optional component content is suitably set within the range that does not damage the effects of the present invention. To be more specific, a total amount of the aromatic polyisocyanate and araliphatic polyisocyanate relative to 100 parts by mass of a total amount of the skin-isocyanate component is, for example, 20 parts by mass or less, preferably 10 parts by mass or less, more preferably 5 parts by mass or less.

The skin-isocyanate component preferably does not contain optional components, consists of aliphatic polyisocyanate and/or alicyclic polyisocyanate, more preferably, consists of alicyclic polyisocyanate.

The skin-active hydrogen group-containing component is a component used for forming the skin layer 4, contains an active hydrogen group (for example, hydroxyl group, amino group, etc.), and examples thereof include the skin-polyol component and skin-amine component.

The skin-active hydrogen group-containing component contains, preferably, as essential components, the skin-polyol component. Examples of the skin-polyol component include the above-described high-molecular weight polyol and the above-described low-molecular-weight polyol. These skin-polyol components may be used singly or in a combination of two or more.

For the skin-polyol component, preferably, the high-molecular weight polyol and the low-molecular-weight polyol are used in combination.

In such a case, for the high-molecular weight polyol, preferably polyetherpolyol, polyesterpolyol, polycarbonatepolyol, and acrylic polyol are used, even more preferably, polyetherpolyol, and polycarbonatepolyol are used.

For the low-molecular-weight polyol, preferably dihydric alcohol is used, more preferably, ethylene glycol and 1,4-butanediol are used.

When the high-molecular weight polyol and the low-molecular-weight polyol are used in combination, the high-molecular weight polyol is blended in an amount relative to a total of 100 parts by mass of the high-molecular weight polyol and the low-molecular-weight polyol of, for example, 70 parts by mass or more, preferably 80 parts by mass or more, and for example, 99 parts by mass or less, preferably 95 parts by mass or less. The low-molecular-weight polyol is blended in an amount of, for example, 1 part by mass or more, preferably 5 parts by mass or more, and for example, 30 parts by mass or less, preferably 20 parts by mass or less.

By using the high-molecular weight polyol and the low-molecular-weight polyol at the above ratio, a buffer material with excellent physical properties such as mechanical properties, designability, durability (light resistance, abrasion resistance, etc.), and touch can be produced.

For the skin-polyol component, the high-molecular weight polyol can also be used singly.

In such a case, for the high-molecular weight polyol, preferably polyetherpolyol and polycarbonatepolyol are used, more preferably, polytetramethylene ether glycol is used.

For the skin-active hydrogen group-containing compound, along with the skin-polyol component, skin-amine component can also be used.

Examples of the skin-amine component include polyamine.

Polyamine is a compound having two or more amino groups, and examples thereof include low-molecular-weight diamines such as ethylenediamine, 1,2-propylene diamine, 1,3-propylene diamine, 1,4-butylenediamine, 1,5-pentamethylenediamine, 1,6-hexamethylenediamine, 2-methyl-1,5-pentanediamine, 3-methyl-1,5-pentanediamine, triethylenediamine, m-xylylenediamine, piperazine, o-, m- and p-phenylenediamine, 1,3-diaminocyclohexane, 1,4-diaminocyclohexane, N,N-(methylene-4,1-phenylene) bis[2-(ethylamino)-urea], 1,3-bis(aminomethyl) cyclohexane, 1,4-bis(aminomethyl) cyclohexane, hydrazine, 3-aminomethyl-3,5-5-trimethylcyclohexylamine (also called; isophoronediamine), 4,4'-dicyclohexylmethanediamine, 2,5 (2,6)-bis(aminomethyl) bicyclo[2.2.1]heptane, 1,amino-3-aminomethyl-3,5,5-trimethylcyclohexane, bis-(4-aminocyclohexyl) methane, diaminocyclohexane, 3,9-bis(3-aminopropyl)2,4,8,10-tetraoxaspiro[5,5]undecane, 2,4-tolylenediamine (2,4-diaminotoluene), 2,6-tolylenediamine (2,6-diaminotoluene), diethyltoluenediamine, 4,4'-diphenylmethanediamine, 2,4'-diphenylmethanediamine, 2,2'-diphenylmethanediamine, 4,4'-diphenylether diamine, 2-nitrodiphenyl-4,4'-diamine, 2,2'-diphenylpropane-4,4'-diamine, 3,3'-dimethyldiphenylmethane-4,4'-diamine, 4,4'-diphenylpropane diamine, m-phenylenediamine, p-phenylenediamine, naphthylene-1,4-diamine, naphthylene-1,5-diamine, 3,3'-dimethoxydiphenyl-4,4'-diamine, 1,3-bis(aminomethyl) benzene, 1,4-bis(aminomethyl) benzene, 1,3-tetramethylxylylenediamine (1,3-di (2-amino-2-methylethyl) benzene), 1,4-tetramethylxylylenediamine (1,4-bis(2-amino-2-methylethyl) benzene), 3,3'-dichloro-4,4'-diaminodiphenylmethane (MOCA), 3,5-bis(methylthio)-2,6-toluenediamine, 3,5-bis(methylthio)-2,4-toluenediamine, 3,5-diethyl-2,6-toluenediamine, and 3,5-diethyl-2,4-toluenediamine; low-molecular-weight triamines such as diethylenetriamine, 4-aminomethyl-1,8-octanediamine, 2,2',2"-triaminotriethylamine, tris-1,1,1-aminoethylethane, 1,2,3-triaminopropane, tris-(3-aminopropyl)-amine, and N,N,N',N'-tetrakis-(2-aminoethyl)-ethylenediamine; and low-molecular-weight polyamines having four or more amino groups such as triethylenetetramine and tetraethylenepentamine.

For the polyamine, furthermore, alkoxysilane-containing diamines such as, for example, N-β (aminoethyl) γ-aminopropyltrimethoxysilane and N-β (aminoethyl) γ-aminopropylmethyldimethoxysilane are used.

These polyamines may be used singly or in a combination of two or more.

For the polyamine, preferably, low-molecular-weight diamine is used, more preferably ethylenediamine, isophoronediamine, bis(aminomethyl) cyclohexane, 4,4'-diphenylmethanediamine, methylenebis(cyclohexylamine), 3,5-diethyl-2,6-toluenediamine, and 3,5-diethyl-2,4-toluenediamine are used.

For the skin-amine component, along with polyamine, monoamine can also be used.

Monoamine is a compound having one amino group, and examples thereof include dimethylamine, diethylamine, di-n-propylamine, diisopropylamine, di-n-butylamine, diisobutylamine, di-t-butylamine, dihexylamine, 2-ethylhexylamine, 3-methoxypropylamine, 3-ethoxypropylamine, 3-(2-ethylhexyloxypropylamine), 3-(dodecyloxy) propylamine, and morpholine.

These monoamines may be used singly or in a combination of two or more.

For the monoamine, preferably, diethylamine is used.

The skin-amine component can be used singly, or can be used in combination of two or more.

For the skin-amine component, preferably, polyamine and monoamine are used in combination, more preferably, ethylenediamine and diethylamine, or isophoronediamine and diethylamine are used in combination.

When polyamine and monoamine are used in combination as the skin-amine component, for example, 70 parts by mass or more, preferably 80 parts by mass or more, and for example, 99 parts by mass or less, preferably 95 parts by mass or less of polyamine relative to 100 parts by mass of a total amount of polyamine and monoamine is blended. Monoamine is blended in an amount of, for example, 1 part by mass or more, preferably 5 parts by mass or more, and for example, 30 parts by mass or less, preferably 20 parts by mass or less relative to 100 parts by mass of a total amount of polyamine and monoamine.

When the high-molecular weight polyol and the skin-amine component are used in combination, the high-molecular weight polyol is blended in an amount of, for example, 70 parts by mass or more, preferably 80 parts by mass or more, and for example, 99 parts by mass or less, preferably 95 parts by mass or less relative to 100 parts by mass of a total amount of the high-molecular weight polyol and the skin-amine component. The skin-amine component is blended in an amount of, for example, 1 part by mass or more, preferably 5 parts by mass or more, and for example, 30 parts by mass or less, preferably 20 parts by mass or less relative to 100 parts by mass of a total amount of the high-molecular weight polyol and the skin-amine component.

When the high-molecular weight polyol and the skin-amine component are blended at the above-described ratio, a buffer material with excellent physical properties such as mechanical properties, designability, durability (light resistance, abrasion resistance, etc.), and touch can be produced.

To produce the skin layer 4, for example, the skin-isocyanate component and the skin-active hydrogen group-containing component are subjected to urethane-forming reaction.

In urethane-forming reaction, for example, a known method such as one-shot process and prepolymer process are used, preferably, prepolymer process is used.

In the prepolymer process, for example, first, the skin-isocyanate component is allowed to react with a portion of the skin-active hydrogen group-containing component (preferably, high-molecular weight polyol) to synthesize an isocyanate group-terminated prepolymer (isocyanate group-terminated prepolymer for forming the skin layer 4) having an isocyanate group at its molecular terminal. Then, the produced isocyanate group-terminated prepolymer is allowed to react with the remaining portion of the skin-active hydrogen group-containing component (preferably, low-molecular-weight polyol, skin-amine component), thereby causing chain extension reaction. In the prepolymer process, the remaining portion of the skin-active hydrogen group-containing component (preferably, low-molecular-weight polyol, skin-amine component) is used as the chain extender.

To be more specific, to synthesize the isocyanate group-terminated prepolymer, the skin-isocyanate component is formulated (mixed) with a portion of the skin-active hydrogen group-containing component (preferably, high-molecular weight polyol) so that the equivalent ratio (NCO/active hydrogen group) of the isocyanate group of the skin-isocyanate component is more than 1.0, for example, 1.1 to 20, preferably 1.3 to 10, more preferably 1.3 to 6 relative to the active hydrogen group (hydroxyl group, amino group) of the portion of the skin-active hydrogen group-containing component (preferably, high-molecular weight polyol), and they are allowed to react in a reaction vessel, at, for example, room temperature to 150° C., preferably 50 to 120° C., for, for example, 0.5 to 18 hours, preferably 2 to 10 hours. In this reaction, as necessary, the above-described urethane-forming catalyst can be added at a suitable ratio, and a solvent to be described later can be blended at a suitable ratio. Preferably, reaction is performed solventlessly, without blending a solvent.

When the components described above are allowed to react solventlessly, preferably, the solvent is added after the completion of reaction so that the isocyanate group-terminated prepolymer is dissolved in the solvent.

Examples of the solvent include ketones such as acetone, methyl ethyl ketone, methylisobutylketone, and cyclohexanone; nitriles such as acetonitrile; alkylesters such as methyl acetate, ethyl acetate, butyl acetate, and isobutyl acetate; aliphatic hydrocarbons such as n-hexane, n-heptane, and octane; alicyclic hydrocarbons such as cyclohexane and methylcyclohexane; aromatic hydrocarbons such as toluene, xylene, and ethylbenzene; glycolether esters such as methylcellosolveacetate, ethylcellosolveacetate, methylcarbitolacetate, ethylcarbitolacetate, ethylene glycol ethylether acetate, propylene glycol methylether acetate, 3-methyl-3-methoxybutylacetate, and ethyl-3-ethoxypropionate; ethers such as diethylether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic solvents such as N-methylpyrrolidone, N,N'-dimethylformamide, N,N'-dimethylacetamide, dimethyl sulfoxide, and hexamethylphosphonylamide.

These solvents may be used singly or in a combination of two or more.

For the solvent, preferably, aprotic solvents are used, more preferably, N,N'-dimethylformamide and N,N'-dimethylacetamide are used. The blending ratio of the solvent is not particularly limited, and is set suitably in accordance with the purpose and application. In this method, as necessary, unreacted skin-isocyanate component can also be removed by known removal methods such as, for example, distillation and extraction.

Next, in this method, the produced isocyanate group-terminated prepolymer and the remaining portion of the skin-active hydrogen group-containing component (preferably, low-molecular-weight polyol, skin-amine component) are allowed to react, preferably in the presence of the above-described solvent (solution polymerization).

For example, when the low-molecular-weight polyol is used as the remaining portion of the skin-active hydrogen group-containing component, to allow the isocyanate group-terminated prepolymer and the remaining portion of the skin-active hydrogen group-containing component (low-molecular-weight polyol) to react, the isocyanate group-terminated prepolymer and the remaining portion of the skin-active hydrogen group-containing component (low-molecular-weight diol) are formulated (mixed) so that the equivalent ratio (NCO/active hydrogen group) of the isocyanate group in the isocyanate group-terminated prepolymer relative to the active hydrogen group (hydroxyl group) of the remaining portion of the skin-active hydrogen group-containing component (low-molecular-weight polyol) is, for example, 0.75 to 1.3, preferably 0.9 to 1.1, and subjected to curing reaction at, for example, room temperature to 250° C., preferably room temperature to 200° C., for, for example, 5 minutes to 72 hours, preferably 1 to 24 hours. In this reaction, as necessary, the above-described urethane-forming catalyst can be added at a suitable ratio.

A solution of polyurethane resin is produced in this manner.

When the skin-amine component diamine is used as the remaining portion of the skin-active hydrogen group-containing component, to allow the isocyanate group-terminated prepolymer and the remaining portion of the skin-active hydrogen group-containing component (skin-amine component) to react, the isocyanate group-terminated prepolymer and the remaining portion of the skin-active hydrogen group-containing component (skin-amine component) are formulated (mixed) so that the equivalent ratio (NCO/active hydrogen group) of the isocyanate group in the isocyanate group-terminated prepolymer relative to the active hydrogen group (amino group) of the remaining portion of the skin-active hydrogen group-containing component (skin-amine component) is, for example, 0.75 to 1.3, preferably 0.9 to 1.1, and subjected to curing reaction at, for example, room temperature to 80° C. preferably, room temperature to 40° C., for, for example, 5 minutes to 8 hours, preferably 10 minutes to 2 hours.

A solution of polyurethane resin having a urea bond is produced in this manner.

The above-described additives (antioxidant, ultraviolet ray absorber, light stabilizer, fire retardant, coloring agent, etc.) can be added to the polyurethane resin solution in accordance with purpose and use. The ratio of the additives added is not particularly limited, and is set suitably.

The thus produced polyurethane resin solution has a polyurethane resin solid content concentration of, for example, 10 mass % or more, preferably 15 mass % or more, and for example, 40 mass % or less, preferably 30 mass % or less.

To form the skin layer 4, the polyurethane resin solution produced as described above is applied, for example, to a desired portion (entire surface of the foam layer 3, and dried.

The application method is not particularly limited, and a known method such as, for example, spray coating method, bar coating method, and brush coating can be used.

The drying conditions are as follows, the drying temperature is, for example, 10° C. or more, preferably 20° C. or more, and for example, 100° C. or less, preferably 90° C. or less. The drying time is, for example, 10 minutes or more, preferably 30 minutes or more, and for example, 24 hours or less, preferably 8 hours or less, more preferably 2 hours or less.

The skin layer 4 made of the polyurethane resin is formed in this manner, and a skinned polyurethane foam 2 in which a foam layer 3 is covered with the skin layer 4 is produced.

The method of forming the skin layer 4 is not limited to the above method, and for example, the polyurethane resin layer can be formed directly on the surface of the foam layer 3 by preparing the skin-isocyanate component and the skin-active hydrogen group-containing component as a 2-component curable polyurethane composition, and applying the 2-component curable polyurethane composition on the surface of the foam layer 3 and allowing them to react.

To be more specific, in the case of the 2-component curable polyurethane composition, a curing agent composed of the skin-isocyanate component and a base component composed of the skin-active hydrogen group-containing component are separately prepared in advance, and they are mixed when in use.

The curing agent is blended with the base component so that the equivalent ratio (NCO/active hydrogen group) of the isocyanate group of the curing agent relative to the active hydrogen group in the base component is, for example, 0.4 or more, preferably 0.5 or more, and for example, 10 or less, preferably 6 or less.

The above-described additives (antioxidant, ultraviolet ray absorber, light stabilizer, fire retardant, coloring agent, etc.) can be added to the 2-component curable polyurethane composition in accordance with purpose and use. The additives can be added to one or both of the base component and the curing agent, can be added simultaneously with blending of the base component with the curing agent, or can be added to the mixture after blending the base component with the curing agent. The additive can be added in an amount without limitation, and the amount can be set suitably.

In this method, the mixture of the base component and the curing agent is applied on the surface of the foam layer 3, dried, and cured (urethane-forming reaction).

The application method is not particularly limited, and a known method such as, for example, spray coating method, bar coating method, and brush coating can be used.

The drying conditions are as follows, the drying temperature is, for example, 10° C. or more, preferably 20° C. or more, and for example, 100° C. or less, preferably 90° C. or less. The drying time is, for example, 10 minutes or more, preferably 30 minutes or more, and for example, 24 hours or less, preferably 8 hours or less, more preferably 2 hours or less.

A skinned polyurethane foam 2 in which the skin layer 4 made of the polyurethane resin is formed on the surface of the foam layer 3, and the foam layer 3 is covered with the skin layer 4 is produced in this manner.

The skin layer 4 can be produced by, preferably, a method in which a solution of polyurethane resin is prepared, and the solution is applied on the foam layer 3 and dried.

Such a method allows for production of a buffer material 1 (skinned polyurethane foam 2) with excellent physical properties such as mechanical property, designability, durability (light resistance, abrasion resistance, etc.), and touch, with good workability.

The skin layer 4 has a thickness of, for example, 1 μm or more, preferably 10 μm or more, more preferably 45 μm or more, more preferably 100 μm or more, particularly preferably 150 μm or more, and for example, 2000 μm or less, preferably 1000 μm or less, more preferably 700 μm or less, more preferably 500 μm or less, particularly preferably 400 μm or less.

When the skin layer 4 has a thickness within the above-described range, a buffer material 1 (skinned polyurethane foam 2) with excellent physical properties such as mechanical property, designability, durability (light resistance, abrasion resistance, etc.), and touch can be produced. Meanwhile, when the thickness of the skin layer 4 is below the above-described lower limit, abrasion resistance is poor, and designability may be reduced. When the skin layer 4 has a thickness of more than the above-described upper limit, reduction in shock absorbing characteristics and deformation of the foam layer 3 may be caused.

The skin layer 4 has a storage modulus at 23° C. ($E'_{coat}$) of $1 \times 10^7$ Pa or more, preferably $3 \times 10^7$ Pa or more, more preferably $5 \times 10^7$ Pa or more, more preferably $7 \times 10^7$ Pa or more, and $3 \times 10^8$ Pa or less, preferably $2 \times 10^8$ Pa or less, more preferably $1 \times 10^8$ Pa or less.

When the skin layer 4 has a storage modulus at 23° C. ($E'_{coat}$) within the above-described range, a buffer material 1 (skinned polyurethane foam 2) with excellent physical properties such as mechanical property, designability, durability (light resistance, abrasion resistance, etc.), and touch can be produced. In particular, generally, a higher storage modulus (E') causes higher abrasion resistance, with polyurethane foam obtained by using aliphatic polyisocyanate or alicyclic polyisocyanate, excessively high storage modulus (E') may reduce abrasion resistance. When the skin layer 4 has a storage modulus at 23° C. ($E'_{coat}$) within the above-described range, wear resistance, tear strength, and hardness (shock resistance) can be achieved at a high level simultaneously.

The ratio of the storage modulus at 23° C. ($E'_{coat}$) of the skin layer 4 relative to the storage modulus at 23° C. ($E'_{foam}$) of the foam layer 3 ($E'_{coat}/E'_{foam}$) is 10 or more, preferably 30 or more, more preferably 50 or more, more preferably 80 or more, and 500 or less, preferably 400 or less, more preferably 300 or less, more preferably 150 or less, particularly preferably 100 or less.

When the ratio of the storage modulus at 23° C. ($E'_{coat}$) of the skin layer 4 relative to the storage modulus at 23° C. ($E'_{foam}$) of the foam layer 3 ($E'_{coat}/E'_{foam}$) is within the above-described range, a buffer material 1 (skinned polyurethane foam 2) with excellent physical properties such as mechanical property, designability, durability (light resistance, abrasion resistance, etc.), and touch can be produced.

The skinned polyurethane foam 2 has a storage modulus at 23° C. ($E'_{total}$) of, for example, $8 \times 10^4$ Pa or more, preferably $1 \times 10^5$ Pa or more, more preferably $5 \times 10^5$ Pa or more, more preferably $7 \times 10^5$ Pa or more, and for example, $2 \times 10^8$ Pa or less, preferably $1 \times 10^7$ Pa or less, more preferably $1 \times 10^6$ Pa or less.

The skinned polyurethane foam 2 has a core density of, for example, 100 kg/m$^3$ or more, preferably 200 kg/m$^3$ or more, more preferably 250 kg/m$^3$ or more, and for example, 500 kg/m$^3$ or less, preferably 450 kg/m$^3$ or less, more preferably 400 kg/m$^3$ or less.

When the skinned polyurethane foam 2 has a core density within the above-described range, a buffer material 1 (skinned polyurethane foam 2) with excellent physical properties such as mechanical property, designability, durability (light resistance, abrasion resistance, etc.), and touch can be produced.

The core density can be measured in accordance with Examples to be described later.

In the buffer material 1, in the skinned polyurethane foam 2 containing essentially no silicone compound, the skin layer 4 is obtained by using the skin-isocyanate component containing aliphatic polyisocyanate and/or alicyclic polyisocyanate, and the storage modulus of the skin layer 4, the storage modulus of the foam layer 3, and their ratio are within the above-described range, and therefore physical properties such as mechanical property, designability, durability (light resistance, abrasion resistance, etc.), and touch are excellent.

To be more specific, in the buffer material 1, the foam layer 3 contains essentially no silicone compound, and thus in the foam layer 3, cell formation failures may cause design failure such as void or underfilling in the foam layer 3.

Figure 2:
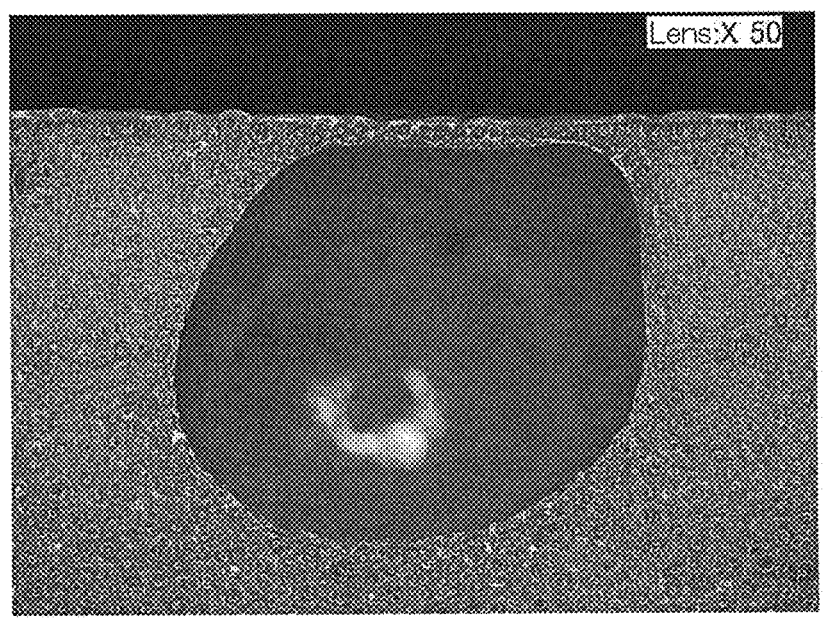
FIG. 2 is a schematic diagram illustrating the configuration of a closed void formed in a foam layer.

For example, as shown in FIG. 2, when closed void (cavity) is caused near the surface of the foam layer 3, a thin portion is formed at the closed void (cavity) of the foam layer 3, and therefore the foam layer 3 is compressed to cause wrinkles near the closed void (cavity), which may reduce designability.

Figure 3:
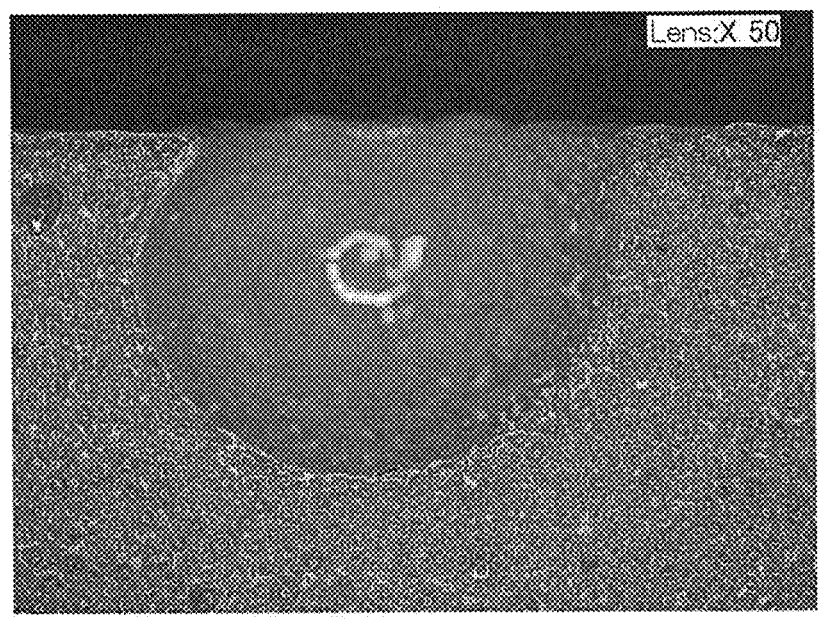
FIG. 3 is a schematic diagram illustrating the configuration of an open void formed in a foam layer.

Furthermore, for example, as shown in FIG. 3, when an open void (underfilling) opening to the surface of the foam layer 3 is caused, the open void (underfilling) itself causes reduction in designability, and reduction in abrasion resistance may be caused at, for example, end edge portions of the open void.

Meanwhile, in the above-described buffer material 1 (that is, buffer material 1 in which the foam layer 3 contains essentially no silicone compound), the skin layer 4 formed on the surface of the foam layer 3 covers the void and underfilling of the foam layer 3, which allows for improvement in designability.

However, such a buffer material 1 (that is, buffer material 1 in which the foam layer 3 containing essentially no silicone compound) having a skin layer 4 with excessively low storage modulus, when the foam layer 3 is deformed, the skin layer 4 conforms to the depressions and projections due to the void and underfilling on the surface of the foam layer 3, and causes wrinkles on the skin layer 4, which may cause poor abrasion resistance (durability) and as a result, may cause poor designability. Mechanical properties such as tear strength may be poor as well.

Furthermore, for example, when the skin layer 4 has an excessively high storage modulus, when the foam layer 3 is deformed, the skin layer 4 is damaged originating from depressions and projections on the surface of the foam layer 3 due to void and underfilling, which may cause poor abrasion resistance (durability), and as a result, may cause poor designability. Furthermore, excessively high hardness may cause poor functionality (shock absorbing characteristics) as the cushioning material. One of the factors is that it is probably because the viscosity of aliphatic polyisocyanate or alicyclic polyisocyanate tend to be low compared with aromatic polyisocyanate or araliphatic polyisocyanate, and therefore with the skin layer 4 obtained by using aliphatic polyisocyanate and/or alicyclic polyisocyanate, it is difficult to stabilize the foamed state.

Furthermore, for example, when the foam layer 3 has an excessively low storage modulus, there are disadvantages in that the number of void or underfilling is relatively large, and the skin layer 4 conforms to the depressions and projections on the surface of the foam layer 3 due to the void or underfilling, which may cause depressions and projections on the surface of the skin layer 4, and poor designability. Mechanical properties such as tear strength may also be poor.

Furthermore, for example, when the foam layer 3 has an excessively high storage modulus, hardness is excessively high, and functionality (shock absorbing characteristics) as the cushioning material may be poor.

Furthermore, when the balance between the storage modulus of the foam layer 3 and the storage modulus of the skin layer 4 is poor, conformability of the skin layer 4 to the foam layer 3 is poor, and touch (feel) and designability may be poor.

In contrast, in the above-described buffer material 1, the skin layer 4 is obtained by using the skin-isocyanate component containing aliphatic polyisocyanate and/or alicyclic polyisocyanate, and the storage modulus of the skin layer 4, the storage modulus of the foam layer 3, and their ratio is within the above-described range, and therefore excellent physical properties such as mechanical property, designability, durability (light resistance, abrasion resistance, etc.), and touch tend to be achieved.

Therefore, the buffer material 1 is provided around various members to suppress damages on members due to collision of various members, damages on members and injuries on living body (human body) due to collision between living body (human body) and members, for example, in various industrial fields, to be specific, in the fields of furniture, robots, and sports.

To be more specific, for example, in the field of furniture, the above-described buffer material 1 is used for corner guard of tables, carpet with cushion, and collision prevention cushion.

In the field of robots, the above-described buffer material 1 is used as, for example, buffer material of industrial robots in various industrial factory such as vehicle factory and food factory, for example, buffer material for management robots for doing management in warehouse and building, and for example, for buffer material for robots in various public facility such as hotels, hospitals, station, and museum, and for example, for buffer material for caregiving robots.

In the field of sports, the above-described buffer material 1 is used, for example, protectors for ball game such as baseball, and for example, protectors for combative sports such as karate.

In particular, the above-described buffer material 1 is suitably used in the field of robots as a buffer material for robots which is attached in robot. To be more specific, the above-described buffer material 1 is suitable as a buffer material for robots (for example, coating robot) for forming coating on the surface of a treatment object by painting.

The present invention includes a robot-with-buffer material, having the above-described buffer material 1 and a robot.

Examples of the robot include industrial robots including coating robots, welding robots, assembling robots, grinding/deburring robots, shipping and receiving management robots, work assisting robots, agricultural work robots, and livestock robots; non-industrial robots including hotel service robots, security robots, cleaning robots, communication robots, entertainment robot, multi-purpose robots, medical robots, welfare robots, disaster coping robots, explorer robot, marine robot, atomic robots, astrological robots, and construction robots; and for example, cutting machine, radio controlled helicopter, radio controlled automobile, radio controlled motorcycle, and pitching machine. Of these, a coating robot and a welding robot are preferable, and particularly preferably, a coating robot is used preferable.

When a coating robot (coating robot) is used as the robot, a robot-with-buffer material is a coating robot-with-buffer material including a buffer material for coating robot and a coating robot.

The buffer material 1 can be disposed on robots by any method without particular limitation, and a known method is used.

Figure 4:
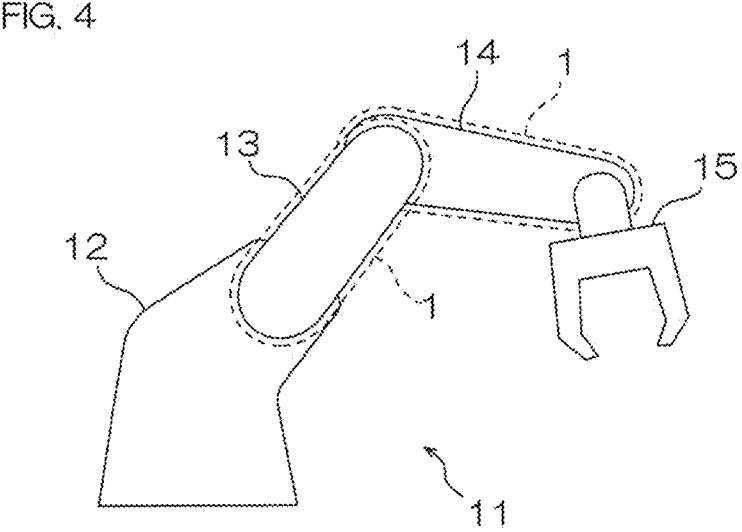
FIG. 4 is a schematic diagram illustrating the configuration of a robot-with-buffer material including the buffer material shown in FIG. 1.

In FIG. 4, a robot-with-buffer material 10 includes a robot 11 and a buffer material 1.

The robot 11 is a known polyarticular robot used in the above-described various fields, and includes a base portion 12, a first arm 13, and a second arm 14, and a hand portion 15.

The base portion 12 is a pedestal for fixing the robot 11 for stabilization, and is formed into an arbitrary shape, and is installed in, for example, horizontal plane. Although not shown, the base portion 12 is movable or rotatable on the horizontal plane, as necessary.

The first arm 13 is connected rotatably relative to the base portion 12 at an upper portion in vertical direction of the base portion 12. For example, the first arm 13 is rotatable along the sheet direction with the connected portion of the base portion 12 and the first arm 13 as the axis.

The second arm 14 is connected pivotably to the first arm 13 at the end portion of the first arm 13 at the opposite side of the connected portion of the first arm 13 and the base portion 12. For example, the second arm 14 is rotatable along the sheet direction with the connected portion of the first arm 13 and the second arm 14 as the axis.

The hand portion 15 is a working portion where works required for the robot 11 is done, and is connected pivotably to the second arm 14 at the end portion of the second arm 14 at the opposite side to the connected portion of the second arm 14 and the first arm 13. For example, the hand portion 15 is rotatable along the sheet direction and the direction perpendicular to the sheet with the connected portion of the second arm 14 and the hand portion 15 as the axis.

In the robot-with-buffer material 10, the buffer material 1 is disposed at arbitrary portions of the robot 11. For example, as shown in the broken line in FIG. 4, the buffer material 1 is provided so as to cover the first arm 13 and/or second arm 14.

In this case, the buffer material 1 is disposed with the skin layer 4 exposed to the air. For example, the buffer material 1 can be divided into a plural number and attached to the first arm 13 and/or second arm 14 so that the first arm 13 and/or second arm 14 are disposed at the center portion of the buffer material 1 (that is, center of the foam layer 2), and for example, the buffer material 1 can be formed into a sheet, and the sheet can be attached to the peripheral surface of the first arm 13 and/or second arm 14.

Such a robot-with-buffer material 10 is used in the above-described various industrial fields for performing various works.

Such a robot-with-buffer material 10 includes the above-described buffer material 1, and therefore has excellent shock-absorbance, and can be suitably used in various industrial fields.

The buffer material of the present invention does not essentially contain silicone compounds, and therefore conductive failure is not easily caused even under environment of long-term use, and conductivity can be kept stably. As described above, in applications where layers (coatings) of paint is formed, effects of paint characteristics can be kept excellently. To be more specific, it is expected that interface strength can be kept high.

EXAMPLES

While in the following, the present invention is described with reference to Examples and Comparative Examples, the present invention is not limited to any of them by no means. The "parts" and "%" are based on mass unless otherwise specified. The specific numerical values in blending ratio (content ratio), property value, and parameter used in the following description can be replaced with upper limit values (numerical values defined as "or less" or "below") or lower limit values (numerical values defined as "or more" or "above") of corresponding numerical values in blending ratio (content ratio), property value, and parameter described in the above-described "DESCRIPTION OF EMBODIMENTS".

The measurement method for the parameters in the following are described below.

<Viscosity>

The viscosity at 25° C. was measured with E-type viscometer TV-30 manufactured by TOKI Sangyo Co., Ltd. (rotor: 1° 34'×R24, rotation speed: selected from the range of 0.1 to 10 rpm so that the measurement range is 20 to 809%).

<Isocyanate Group Content (Mass %)>

Measurement was made by n-dibutylamine method in conformity with JIS K-1603 (2007) using a potential difference titrator.

<Average Hydroxyl Number (Mg KOH/g)>

The average hydroxyl number of the foaming-active hydrogen group-containing component was measured by phthalation method in accordance with JIS K-1557-1 (2007).

<Average Functionality>

The average functionality (hydroxyl group) of the foaming-active hydrogen group-containing component was determined based on the following formula.

That is, when polyoxyalkylene polyol is used as the foaming-active hydrogen group-containing component, the average functionality (hydroxyl group) of polyoxyalkylene polyol was determined from the functionality of the initiator and the mol percentage of the initiator in production of polyoxyalkylene polyol. To be specific, the calculation was made as follows.

(Average functionality)=((mol % of the initiator having functionality of 2 in the total amount of initiator)×2+(mol % of the initiator having functionality of 3 in the total amount of initiator)×3+(mol % of the initiator having functionality of 4 in the total amount of initiator)×4+ (mol % of the initiator having functionality of 8 in the total amount of initiator)×8)

Skin Layer Materials

Production Example 1 (Production of 1,4-bis(isocyanatomethyl) cyclohexane (1,4-BIC))

1,4-bis(aminomethyl)cyclohexane (manufactured by Mitsubishi Gas Chemical Company, Inc.) having a trans/cis ratio of 86/14 determined by $^{13}$C-NMR was used to perform cold/hot two-stage phosgenation method under pressure.

A pressurized reactor with jacket equipped with an electromagnetic induction stirrer, an automatic pressure regulating valve, a thermometer, a nitrogen inlet line, a phosgene inlet line, a condenser, and a material feed pump was charged with 2500 parts by mass of o-dichlorobenzene. Then, 1425 parts by mass of phosgene was added from the phosgene inlet line, and stirring was started. Cold water was allowed to go through the reactor jacket so that the internal temperature was kept to about 10° C. Then, a solution of 400 parts by mass of 1,4-bis(aminomethyl) cyclohexane dissolved in 2500 parts by mass of o-dichlorobenzene was fed through the feed pump taking 60 minutes, and cold phosgenation was started at 30° C. or less under normal pressure. After the completion of the feed, a light-brown white slurry was formed in the flask.

Then, while the temperature of the internal liquid of the reactor was increased to 140° C. taking 60 minutes, the pressure was increased to 0.25 MPa, and further hot phosgenation was performed under a pressure of 0.25 MPa, and at a reaction temperature of 140° C. for 2 hours. During the hot phosgenation, 480 parts by mass of phosgene was further added. In the process of the hot phosgenation, the internal liquid of the flask became light-brown clear solution. After completion of hot phosgenation, at 100 to 140° C., nitrogen gas was allowed to pass through at 100 L/hour, and degassing was performed.

Then, after the solvent o-dichlorobenzene was distilled off under reduced pressure, using a rectification device equipped with a condenser and a distillation column (manufactured by SIBATA SCIENTIFIC TECHNOLOGY LTD., trade name; distillation column K type) having a glass-made flask with a distillation pipe charged with four elements of packing materials (manufactured by Sumitomo Heavy Industries, Ltd., trade name: Sumitomo/Sulzer Laboratory packing EX type) and a reflux ratio adjusting timer, rectification was performed under conditions of 138 to 143° C. and 0.7 to 1 KPa while further refluxing, thereby producing 382 parts by mass of 1,4-bis(isocyanatomethyl) cyclohexane hereinafter 1,4-BIC).

The produced 1,4-BIC had a purity of 99.9% by gas chromatography measurement, a color with APHA analysis of 5, and a trans/cis ratio by $^{13}$C-NMR measurement of 86/14.

Polyurethane Resin Solution

Preparation Example 1 (Preparation of Polyurethane Resin Solution (A-3-1))

In a nitrogen atmosphere, a reactor equipped with an anchor blade, thermometer, and water-cooling condenser, and capable of continuously measuring mixing torque was charged with 81.3 parts by mass of ETERNACOL UH-200 (polycarbonatediol with number average molecular weight 2000, manufactured by Ube Industries, Ltd.) subjected to dehydration process under reduced pressure in advance, 40.7 parts by mass of ETERNACOLL UH-100 (polycarbonatediol with number average molecular weight 1000, manufactured by Ube Industries, Ltd.) subjected to dehydration process under reduced pressure in advance, and 63.0 parts by mass of 1,4-BIC produced in Production Example 1, and the temperature of the mixture was increased to 80° C. with the mixing speed of 200 rpm.

Then, after performing reaction at 80° C. for 1 hour, 0.004 parts by mass of Stanoct (stannous octoate, manufactured by Mitsubishi Chemical Corporation) was added as the catalyst.

Then, after performing reaction at 80° C. for 2 hours, reaction was performed until the isocyanate group concentration reaches 10.9 mass %, thereby producing an isocyanate group-terminated prepolymer.

Then, the isocyanate group-terminated prepolymer was cooled to 50° C., and thereafter, 765 parts by mass of N,N'-dimethylacetamide (hereinafter DMAc), which was dehydrated in advance by immersion of molecular sieves 4A, was gradually added with a stirring speed of 300 rpm, so that the isocyanate group-terminated prepolymer concentration was 20 mass %, thereby dissolving the isocyanate group-terminated prepolymer.

Thereafter, the DMAc solution of isocyanate group-terminated prepolymer was heated again to 80° C. or less. Then, 35.3 parts by mass of ethylene glycol (ethylene glycol, manufactured by KANTO CHEMICAL CO., INC., reagent, S-grade, (hereinafter EG)) diluted with DMAc to 40 mass %, and 0.15 parts by mass of Stanoct (stannous octoate, manufactured by Mitsubishi Chemical Corporation) were added. After performing reaction at 80° C. for 6 hours, 2.3 parts by mass of EG diluted with DMAc to 40 mass % was added, and reaction was performed further at 80° C. for 1 hour.

Additives and a solvent were added. To be specific, 6.1 parts by mass (solid content 0.61 parts by mass) of IRGANOX 245 (heat resistant stabilizer, manufactured by BASF), 5.1 parts by mass (solid content 0.51 parts by mass) of TINUVIN 234 (ultraviolet ray absorber, manufactured by BASF), and 3.0 parts by mass (solid content 0.30 parts by mass) of ADK STABLA-72 (light stabilizer, manufactured by ADEKA), each dissolved in DMAc to 10 mass %. Thereafter, 500 parts by mass of methyl ethyl ketone (hereinafter MEK) was added.

The polyurethane resin solution (A-3-1) was produced in this manner. The produced solution had a solid content concentration of 15 mass %.

Preparation Example 2 (Polyurethane Resin Solution (A-3-2))

An isocyanate group-terminated prepolymer was prepared in the same manner as in Preparation Example 1, except that the blending formulation was changed in accordance with Table 1, and then the isocyanate group-terminated prepolymer was dissolved in DMAc.

Thereafter, DMAc solution of isocyanate group-terminated prepolymer was cooled to 15° C. or less. 3.2 parts by mass of ethylenediamine (manufactured by KANTO CHEMICAL CO., INC. reagent S-grade, (hereinafter EDA)) and 0.23 parts by mass of diethylamine (manufactured by KANTO CHEMICAL CO., INC. reagent S-grade, (hereinafter DEA)) were diluted with DMAc to 10 mass %, and they were mixed. 34.6 parts by mass of the produced mixture solution was dropped in while keeping the temperature to 30° C. or less. After dropping, the temperature was increased to 60° C., and reaction was performed for 1 hour.

Thereafter, additives and a solvent were added in the same manner as in Preparation Example 1, thereby producing polyurethane resin solution (A-3-2). The produced solution had a solid content concentration of 15 mass %.

Preparation Example 3 (Polyurethane Resin Solution (A-3-3))

A polyurethane resin solution (A-3-3) was produced in the same manner as in Preparation Example 1, except that the blending formulation was changed in accordance with Table 1. The produced solution had a solid content concentration of 15 mass %.

Preparation Example 4 (Polyurethane Resin Solution (A-3-4)

A polyurethane resin solution (A-3-4) was produced in the same manner as in Preparation Example 1, except that the blending formulation was changed in accordance with Table 1. The produced solution had a solid content concentration of 15 mass %.

Preparation Example 5 (Polyurethane Resin Solution (A-3-5))

A polyurethane resin solution (A-3-5) was produced in the same manner as in Preparation Example 1, except that the blending formulation was changed in accordance with Table 1. The produced solution had a solid content concentration of 15 mass %.

Preparation Example 6 (Polyurethane Resin Solution (A-3-6))

A polyurethane resin solution (A-3-6) was produced in the same manner as in Preparation Example 1, except that the blending formulation was changed in accordance with Table 1. The produced solution had a solid content concentration of 15 mass %.

Preparation Example 7 (Polyurethane Resin Solution (A-3-7))

A polyurethane resin solution (A-3-7) was produced in the same manner as in Preparation Example 1, except that the blending formulation was changed in accordance with Table 1. The produced solution had a solid content concentration of 15 mass %.

Preparation Example 8 (Polyurethane Resin Solution (A-3-8))

A polyurethane resin solution (A-3-8) was produced in the same manner as in Preparation Example 1, except that the blending formulation was changed in accordance with Table 1. The produced solution had a solid content concentration of 15 mass %.

Preparation Example 9 (2-Component Curable Polyurethane Composition (A-3-9))

71.5 parts by mass of OLESTAR Q164 (acrylic polyol, manufactured by Mitsui Chemicals, Inc., non-volatile 45 mass %), 28.1 parts by mass of Kuraray Co., Ltd. polyol P-2010 (polyesterpolyol, manufactured by Kuraray Co., Ltd.), and 9.4 parts by mass of PLACCEL 303 (polyesterpolyol, manufactured by Daicel Chemical Industries Ltd.) were mixed, and furthermore, 763 parts by mass of MEK, and 50 ppm of dibutyltindilaurate (manufactured by Wako Pure Chemical Industries, Ltd., reagent) were added, thereby preparing a base component.

Meanwhile, 41.0 parts by mass of TAKENATE D-170N (isocyanurate-modified hexamethylenediisocyanate, manufactured by Mitsui Chemicals, Inc.) was prepared as the curing agent.

They, were named a 2-component curable polyurethane resin composition (A-3-9).

The 2-component curable polyurethane resin composition was used by mixing the base component and the curing agent immediately before use. The mixture of the base component and the curing agent had a solid content concentration of 15 mass %.

Preparation Example 10 (2-Component Curable Polyurethane Composition (A-3-10))

In a nitrogen atmosphere, a reactor equipped with an anchor blade, thermometer, and water-cooling condenser, and capable of continuously measuring mixing torque was charged with 145 parts by mass of PTG-1000SN (polytetramethylene ether glycol with number average molecular weight 1000, manufactured by Hodogaya Chemical Co., Ltd.) subjected to dehydration treatment under reduced pressure in advance, and 855 parts by mass of VESTANAT $H_{12}MDI$ (4,4'-methylenebis(cyclohexyl isocyanate), manufactured by Evonic Corporation), and the temperature of the mixture was increased to 80° C. with a mixing speed of 200 rpm. Then, mixing was performed at 80° C. for 1 hour.

Then, after performing reaction at 80° C. for 2 hours, reaction was performed until the isocyanate group concentration reaches 26.0 mass %, thereby producing an isocyanate group-terminated prepolymer (A-3-10-1) for a 2-component polyurethane resin composition (A-3-10).

This was named a curing agent for a 2-component polyurethane resin composition (A-3-10).

Then, in a nitrogen atmosphere, a reactor equipped with an anchor blade, thermometer, and water-cooling condenser, and capable of continuously measuring mixing torque was charged with 550 parts by mass of PTG-1000SN (polytetramethylene ether glycol with number average molecular weight 1000, manufactured by Hodogaya Chemical Co., Ltd.) subjected to dehydration treatment under reduced pressure in advance, 230 parts by mass of ETHACURER 100 (diethyltoluenediamine, manufactured by ALBEMARLE JAPAN CORPORATION), 200 parts by mass of MDA-220 (4,4'-diphenylmethanediamine, manufactured by Mitsui Chemicals, Inc.), 2.7 parts by mass of IRGANOX 245 (heat resistant stabilizer, manufactured by BASF), 2.3 parts by mass of TINUVIN 234 (ultraviolet ray absorber, manufactured by BASF), and 1.3 parts by mass of ADK STABLA-72 (light stabilizer, manufactured by ADEKA). Mixing was performed at 80° C. for 1 hour, thereby producing a polyol resin premix (A-3-10-2) for a 2-component polyurethane resin composition (A-3-10).

This was named a base component for a 2-component polyurethane resin composition (A-3-10).

TABLE 1

| | | | | | Preparation Example 1 | Preparation Example 2 | Preparation Example 3 | Preparation Example 4 |
|---|---|---|---|---|---|---|---|---|
| | | Polyurethane resin solution | | | A-3-1 | A-3-2 | A-3-3 | A-3-4 |
| Blending formulation (parts by mass) | Isocyanate group-terminated prepolymer | Polyisocyanate | 1,4-BIC | | 63.0 | — | — | — |
| | | | HDI | | — | — | 48.9 | — |
| | | | MDI | | — | — | — | 21.9 |
| | | | $H_{12}MDI$ | | — | 23.2 | — | — |
| | | Polyol | PTG2000 | | — | 176.8 | — | 175.2 |
| | | | UH-100 | | 40.7 | — | 46.3 | — |
| | | | UH-200 | | 81.3 | — | 92.6 | — |
| | | Catalyst | Stanoct | | 0.004 | 0.004 | 0.004 | — |
| | | NCO group content of prepolymer [%] | | | 10.9 | 2.3 | 8.7 | 2 |
| | | DMAc | | | 765 | 684 | 769 | 783 |
| Chain extender | | 40% EG DMAc solution (amount added for the first time) | | | 35.3 | — | 28.2 | 5.0 |
| | | 40% EG DMAc solution (amount added for the second time) | | | 2.3 | — | 2.3 | 2.3 |
| | | 10% IPDA DMAc solution | | | — | — | — | — |
| | | 10% EDA DMAc solution | | | — | 32.2 | — | — |
| | | 10% DEA DMAc solution | | | — | 2.4 | — | — |
| Catalyst | | Stanoct | | | 0.15 | 0.15 | 0.15 | 0.10 |
| Additive | | 10% IRGANOX 245 DMAc solution | | | 6.1 | 6.1 | 6.1 | 6.1 |
| | | 10% TINUVIN 234 DMAc solution | | | 5.1 | 5.1 | 5.1 | 5.1 |
| | | 10% ADK STABLA-72 DMAc solution | | | 3.0 | 3.0 | 3.0 | 3.0 |
| | | MEK | | | 500 | 500 | 500 | 500 |

| | | | | | Preparation Example 5 | Preparation Example 6 | Preparation Example 7 | Preparation Example 8 |
|---|---|---|---|---|---|---|---|---|
| | | Polyurethane resin solution | | | A-3-5 | A-3-6 | A-3-7 | A-3-8 |
| Blending formulation (parts by mass) | Isocyanate group-terminated prepolymer | Polyisocyanate | 1,4-BIC | | 17.4 | 17.4 | 46.4 | 53.1 |
| | | | HDI | | — | — | — | — |
| | | | MDI | | — | — | — | — |
| | | | $H_{12}MDI$ | | — | — | — | — |
| | | Polyol | PTG2000 | | 179.5 | 179.3 | — | — |
| | | | UH-100 | | — | — | 39.9 | 34.3 |
| | | | UH-200 | | — | — | 79.8 | 68.6 |
| | | Catalyst | Stanoct | | 0.004 | 0.004 | 0.004 | 0.004 |
| | | NCO group content of prepolymer [%] | | | 2.1 | 2.3 | 7.9 | 10.9 |
| | | DMAc | | | 783 | 782 | 482 | 391 |
| Chain extender | | 40% EG DMAc solution (amount added for the first time) | | | 5.4 | 6.1 | — | — |
| | | 40% EG DMAc solution (amount added for the second time) | | | 2.3 | 2.3 | — | — |
| | | 10% IPDA DMAc solution | | | — | — | 339.6 | 440.2 |
| | | 10% EDA DMAc solution | | | — | — | — | — |
| | | 10% DEA DMAc solution | | | — | — | 6.8 | 8.8 |
| Catalyst | | Stanoct | | | 0.15 | 0.15 | 0.15 | 0.15 |
| Additive | | 10% IRGANOX 245 DMAc solution | | | 6.1 | 6.1 | 6.1 | 6.1 |
| | | 10% TINUVIN 234 DMAc solution | | | 5.1 | 5.1 | 5.1 | 5.1 |
| | | 10% ADK STABLA-72 DMAc solution | | | 3.0 | 3.0 | 3.0 | 3.0 |
| | | MEK | | | 500 | 500 | 500 | 500 |

The abbreviations are described below.
HDI: TAKENATE 700, hexamethylenediisocyanate, manufactured by Mitsui Chemicals, Inc.
MDI: Cosmonate PH, 4,4'-diphenylmethane diisocyanate, manufactured by Mitsui Chemicals, Inc.
$H_{12}$MDI: VESTANAT $H_{12}$MDI, 4,4'-dicyclohexylmethane-diisocyanate, manufactured by Evonic Corporation
PTG 1000: PTG-1000SN, polytetramethylene ether glycol with number average molecular weight 1000, manufactured by Hodogaya Chemical Co., LTD.
PTG 2000: PTG-2000SN, polytetramethylene ether glycol with number average molecular weight 2000, manufactured by Hodogaya Chemical Co., LTD.
UH-100: ETERNACOLL UH-100, polycarbonatediol with number average molecular weight 1000, manufactured by Ube Industries, Ltd.
UH-200: ETERNACOLL UH-200, polycarbonatediol with number average molecular weight 2000, manufactured by Ube Industries, Ltd.
Stanoct: stannous octoate, manufactured by Mitsubishi Chemical Corporation
DMAc: N,N'-dimethylacetamide, manufactured by KANTO CHEMICAL CO., INC. reagent S-grade
EG: ethylene glycol, manufactured by KANTO CHEMICAL CO., INC. reagent S-grade
IPDA: VESTAMIN IPDA, isophoronediamine, manufactured by Evonic Corporation
EDA: ethylenediamine, manufactured by KANTO CHEMICAL CO., INC. reagent S-grade
DEA: diethylamine, manufactured by KANTO CHEMICAL CO., INC. reagent S-grade
DETDA: diethyltoluenediamine, manufactured by ALBEMARLE JAPAN CORPORATION, ETHACURER 100
MDA: 4,4'diphenylmethanediamine, manufactured by Mitsui Chemicals, Inc., MDA-220
IRGANOX 245: heat resistant stabilizer, manufactured by BASF
TINUVIN 234: hindered amine stabilizer, manufactured by BASF
ADK STAB LA-72: ultraviolet ray absorber, manufactured by ADEKA
MEK: methyl ethyl ketone, manufactured by KANTO CHEMICAL CO., INC. reagent S-grade
OLESTAR Q164: acrylic polyol, manufactured by Mitsui Chemicals, Inc., non-volatile 45 mass %

Materials for Foam Layer

Foaming-Isocyanate Component (B-1)

Production Example 1 (Production of Isocyanate Group-Terminated Prepolymer)

Polyisocyanate (B-1-1)
Polyisocyanate (B-1-1) was made by mixing Cosmonate PH (manufactured by Mitsui Chemicals, Inc., 4,4'-diphenylmethane diisocyanate). Cosmonate PI (manufactured by Mitsui Chemicals, Inc., diphenylmethane diisocyanate (2,4'-diphenylmethane diisocyanate content 50 mass %)), and Cosmonate M-200 (manufactured by Mitsui Chemicals, Inc., polymethylenepolyphenylisocyanate with NCO content 31.3 mass %), at a ratio of Cosmonate PH/Cosmonate PI/Cosmonate M-200=17.8/35.1/27.8 (mass ratio), thereby producing polyisocyanate (B-1-1).
Polyetherpolyol (B-1-2)
Relative to 1 mol of Glycerin, 0.37 mol of potassium hydroxide was added, and the mixture was subjected to dehydration process under reduced pressure at 100° C. for 6 hours. Thereafter, propylene oxide was subjected to addition polymerization at a reaction temperature of 115° C. and a reaction pressure of 0.5 MPa G. Thereafter, neutralization with aqueous solution of phosphoric acid was performed, and the catalyst was removed, thereby producing polyetherpolyol (B-1-2).
The produced polyetherpolyol was polyoxyalkylene (C2 to 3) polyol having an average functionality of 3, a weight-average molecular weight of 5000, a hydroxyl number of 34 mg KOH/g, and an ethylene oxide content of 0 mass %.
Prepolymer Formation Reaction
Polyisocyanate (B-1-1) was blended with polyetherpolyol (B-1-2) at a ratio of (B-1-1)/(B-1-2)=80.7/19.3 (mass ratio), and reaction was performed at 80° C. for 3 hours. The isocyanate group-terminated prepolymer was produced in this manner. This was named foaming-isocyanate component (B-1).
The isocyanate group-terminated prepolymer had a viscosity at 25° C. of 150 mPa·s and an isocyanate group content of 25.4 mass %.

Foaming-Active Hydrogen Group-Containing Component (B-2-1)

Production Example 2 (Production of Polyol (B-2-1-1))

To 1 mol of glycerin, 0.01 mol of tetrakis[tris(dimethylamino)phosphoranylideneamino]phosphonium hydroxyde described in Japanese Patent Publication No. 4201233 was added, and dehydration was performed under reduced pressure at 100° C. for 6 hours.
Thereafter, propylene oxide was subjected to addition polymerization at a reaction temperature of 80° C., and maximum reaction pressure of 0.4 MPa G, and then, ethylene oxide was subjected to addition polymerization at a reaction temperature of 100° C. Thereafter, the catalyst was removed by the method described in Japanese Patent Publication No. 4201233, thereby producing polyol (B-2-1-1).
The produced polyol was polyoxyalkylene (C2 to 3) polyol having an average functionality of 3, a weight-average molecular weight of 5000, a hydroxyl number of 34 mg KOH/g, and an ethylene oxide content of 14 mass %.

Production Example 3 (Polyol (B-2-1-2))

To 1 mol of dipropylene glycol, 0.37 mol of potassium hydroxide was added, and dehydration was performed under reduced pressure at 100° C. for 6 hours.
Thereafter, propylene oxide was subjected to addition polymerization at a reaction temperature of 115° C., and a reaction pressure of 0.5 MPa G, and then, ethylene oxide was subjected to addition polymerization at a reaction temperature of 115° C. Thereafter, the catalyst was removed, thereby producing polyol (B-2-1-2).
The produced polyol was polyoxyalkylene (C2 to 3) polyol having an average functionality of 2, a weight-average molecular weight of 4000, a hydroxyl number of 28 mg KOH/g, and an ethylene oxide content of 20 mass %.

Production Example 4 (Polyol (B-2-1-3))

To 1 mol of pentaerythritol, 0.37 mol of potassium hydroxide was added, and dehydration was performed under reduced pressure at 100° C. for 6 hours.

Thereafter, propylene oxide was subjected to addition polymerization at a reaction temperature of 115° C., and a reaction pressure of 0.5 MPa G, and then, ethylene oxide was subjected to addition polymerization at a reaction temperature of 115° C. Thereafter, the catalyst was removed, thereby removing polyol (B-2-1-3).

The produced polyol was polyoxyalkylene (C2 to 3) polyol having an average functionality of 4, a weight-average molecular weight of 8000, a hydroxyl number of 33 mg KOH/g, and an ethylene oxide content of 15 mass %.

Production Example 5 (Polyol (B-2-1-4))

To 0.6 mol of sucrose (sugar) and 0.4 mol of glycerin, 0.37 mol of potassium hydroxide was added, and dehydration was performed under reduced pressure at 100° C. for 6 hours.

Thereafter, propylene oxide was subjected to addition polymerization at a reaction temperature of 115° C. and a reaction pressure of 0.5 MPa G, and then, ethylene oxide was subjected to addition polymerization at a reaction temperature of 115° C. Thereafter, the catalyst was removed, thereby producing polyol (B-2-1-4).

The produced polyol was polyoxyalkylene (C2 to 3) polyol having an average functionality of 5, a weight-average molecular weight of 7000, a hydroxyl number of 42 mg KOH/g, an ethylene oxide content of 10 mass %.

Production Example 6 (Polyol (B-2-1-5))

To 1 mol of glycerin, 0.01 mol of tetrakis[tris(dimethylamino)phosphoranylideneamino]phosphonium hydroxy described in Japanese Patent Publication No. 4201233 was added, and dehydration was performed under reduced pressure at 100° C. for 6 hours.

Thereafter, propylene oxide was subjected to addition polymerization at a reaction temperature of 80° C., and maximum reaction pressure of 0.4 MPa G. and then, ethylene oxide was subjected to addition polymerization at a reaction temperature of 100° C. Thereafter, the catalyst was removed by the method described in Japanese Patent Publication No. 4201233, thereby producing polyol (B-2-1-5).

The produced polyol was polyoxyalkylene (C2 to 3) polyol having an average functionality of 3, a weight-average molecular weight of 9000, a hydroxyl number of 19 mg KOH/g, and an ethylene oxide content of 14 mass %.

Production Example 7 (Polyol (B-2-1-6))

To 1 mol of glycerin, 0.01 mol of tetrakis[tris(dimethylamino)phosphoranylideneamino]phosphonium hydroxy described in Japanese Pa tent Publication No. 4201233 was added, and dehydration was performed under reduced pressure at 100° C. for 6 hours.

Thereafter, propylene oxide was subjected to addition polymerization at a reaction temperature of 80° C. and maximum reaction pressure of 0.4 MPa G, and then, ethylene oxide was subjected to addition polymerization at a reaction temperature of 100° C. Thereafter, the catalyst was removed by the method described in Japanese Patent Publication No. 4201233, thereby producing polyol (B-2-1-6).

The produced polyol was polyoxyalkylene (C2 to 3) polyol having an average functionality of 3, a weight-average molecular weight of 7000, a hydroxyl number of 24 mg KOH/g, and an ethylene oxide content of 13 mass %.

Production Example 8 (Polyol (B-2-1-7))

To 1 mol of glycerin, 0.37 mol of potassium hydroxide was added, and dehydration was performed under reduced pressure at 100° C. for 6 hours.

Thereafter, propylene oxide was subjected to addition polymerization at a reaction temperature of 115° C. and a reaction pressure of 0.5 MPa G, and then, ethylene oxide was subjected to addition polymerization at a reaction temperature of 115° C. Thereafter, the catalyst was removed, thereby producing polyol (B-2-1-7).

The produced polyol was polyoxyalkylene (C2 to 3) polyol having an average functionality of 3, a weight-average molecular weight of 6000, a hydroxyl number of 56 mg KOH/g, and an ethylene oxide content of 15 mass %.

Production Example 9 (Polyol (B-2-1-8))

To 1 mol of glycerin, 0.37 mol of potassium hydroxide was added, and dehydration was performed under reduced pressure at 100° C. for 6 hours.

Thereafter, propylene oxide was subjected to addition polymerization at a reaction temperature of 115° C. and a reaction pressure of 0.5 MPa G, and then, ethylene oxide was subjected to addition polymerization at a reaction temperature of 115° C. Thereafter, the catalyst was removed, thereby producing polyol (B-2-1-8).

The produced polyol was polyoxyalkylene (C2 to 3) polyol having an average functionality of 3, a weight-average molecular weight of 2000, a hydroxyl number of 84 mg KOH/g, and an ethylene oxide content of 15 mass %.

Polyurethane Foam

Examples 1 to 21 and Comparative Examples 1 to 11

(1) Foam Layer

First, a mold (size: 40 cm×40 cm×5 cm) including an upper mold and a lower mold was prepared. Then, a release agent FR-1000 (manufactured by NEOS COMPANY LIMITED, wax type release agent) was applied by spray application method to an inner side surface of the upper mold, and the inner side surface of the lower mold.

Then, a polyurethane composition was prepared by the following method.

That is, in the blending formulation shown in Tables 2 to 7, the components excluding the foaming-isocyanate component (B-1) were weighed, and they were blended in a laboratory room at a temperature of 23° C. and a relative humidity of 55%, and stirred to be homogeneous, thereby preparing a premix (B-2).

A separately prepared foaming-isocyanate component (B-1) was weighed in accordance with the blending formulation of Tables 2 to 7, and the temperature was adjusted to 23° C.

Thereafter, to the premix (B-2), the foaming-isocyanate component (B-1) was added so that the isocyanate index was as shown in Tables 2 to 7, and the mixture was stirred with a hand-mixer (number of revolution 5000 rpm) for 15 seconds, thereby preparing a polyurethane composition.

Then, immediately after preparing the polyurethane composition, the polyurethane composition was quickly injected into the inner space of the mold in which the upper mold and the lower mold were joined, thereby allowing foaming.

Then, it was removed from the mold after 10 minutes from the start of the stirring, thereby producing a polyurethane foam (B).

The polyurethane foam (B) was used as a foam layer.

(2) Skin Layer

A skin layer was formed on the entire surface of the polyurethane foam (B) produced as described above by the following method.

That is, the polyurethane resin solution described in Tables 2 to 7 was applied on the entire surface of the polyurethane foam (B) so that the thickness after drying was as shown in Tables 2 to 7 by a spray coating method, and dried for 1 hour.

In Example 4, instead of polyurethane resin solution, 2-component curable polyurethane composition (A-3-9) was used. To be specific, the base component and the curing agent were blended immediately before use, and the mixture was applied by air spray method on the entire surface of the polyurethane foam (B) so that the thickness after drying was as shown in Tables 2 to 7, and dried for 1 hour.

The polyurethane resin layer (A) was formed on the surface of the polyurethane foam (B) in this manner. The polyurethane resin layer (A) was used as the skin layer, thereby producing a skinned polyurethane foam.

In Example 5, instead of polyurethane resin solution, 2-component curable polyurethane composition (A-3-10) was used.

To be more specific, the isocyanate group-terminated prepolymer (A-3-10-1, curing agent) and the polyol resin premix (A-3-10-2, base component) were mixed at 1/1 (volume ratio) and an isocyanate index 1.04 using a 2-component mix spraying machine, and sprayed.

In spraying, a spraying machine H-20 manufactured by Gusmer was used, and the liquid was sent to the spraying machine using a supplying pump manufactured by Graco (air driven 2:1 type) while applying an air pressure of 0.5 MPa.

The spraying machine had a pressure of 12 MPa when not in operation, and 10 to 11 MPa when spraying. The primary heater at the isocyanate group-terminated prepolymer (A-3-10-1, curing agent) side was set to 65° C. the primary heater at the polyol resin premix (A-3-10-2, base component) side was set to 65° C., and the hose heater was set to 60° C.

In this manner, the polyurethane resin layer (A) was formed on the surface of the polyurethane foam (B). The polyurethane resin layer (A) was used as the skin layer, and a skinned polyurethane foam was produced.

<<Evaluation>>

<Storage Modulus>

The storage modulus of the skin layer ($E'_{coat}$) and the storage modulus of the foam layer ($E'_{foam}$) was determined by the following method.

That is, using a dynamic viscoelasticity device (manufactured by Rheometric Scientific Far East Ltd., model: RSA-II), the skin layer was subjected to measurement under tensile mode, with conditions of frequency 10 Hz and a temperature increase speed 5° C./min. The dynamic viscoelasticity temperature dependency was measured, and the storage modulus at 23° C. was defined as the storage modulus ($E'_{coat}$) of the skin layer. A sample having a size of 20 mm×20 mm×5 mm cut out from the core of the foam layer was subjected to measurement under compression mode with conditions of frequency 10 Hz, and the temperature increase speed of 5° C./min. The dynamic viscoelasticity temperature dependency was measured, and the storage modulus at 23° C. was defined as the storage modulus ($E'_{coat}$) of the skin layer. The results are shown in Tables 2 to 7.

The ratio of the storage modulus of the skin layer ($E'_{coat}$) relative to the storage modulus ($E'_{foam}$) of the foam layer ($E'_{coat}/E'_{foam}$) was calculated. The results are shown in Tables 2 to 7.

<Core Density>

The core density of the skinned polyurethane foam was determined in the following method.

A sample having a size of 100 mm×100 mm×30 mm cut out from the core of the foam layer was measured, and the sample weight was divided by the sample volume to calculate the core density. The results are shown in Tables 2 to 7.

<Measurement Method of Wear Resistance>

The produced skinned polyurethane foam was evaluated in accordance with wear resistance of JIS L 0849(2013).

That is, the skinned polyurethane foam was sliced so that the slice had a thickness of 10 mm from the lower portion of the skin layer (foam layer side), and a test piece having a size of 25×170 mm was taken from the produced sheet. The sample was set in an abrasion tester (trade name, color fastness rubbing tester, manufactured by YASUDA SEIKI SEISAKUSHO, LTD.) with its skin layer facing above. An abrading head was covered with white cotton cloth of about 50×50 mm and the cloth was fixed, and abrasion was performed for 100 times of back and forth at a speed of 30 times/min with a load of 5N between two points having a distance of 100 mm.

After the test, the while cotton cloth was checked as to smudges and changes in appearance by the points of 5. The evaluation criteria for appearance are shown below.

5 points no change 4 points gloss of the coating reduced, and changes in ΔL value of more than 1.0 was caused 3 points deformation of depressions and projections generated on coating along voids 2 points cracks generated on coating 1 point tear generated on coating <Shock Absorbing Characteristics (C Hardness)>

A rectangular parallelepiped having a size of 10×10×5 cm was cut out from the center portion (core) of the skinned polyurethane foam to prepare a measurement sample, and thereafter, hardness (C hardness) of the measurement sample was measured in accordance with JIS K-6400(2012).

<Light Resistance>

A measurement sample was made by cutting out from the center portion of the skinned polyurethane foam to a size of a thickness of 10 mm, and thereafter, the measurement sample was irradiated with light including short-wavelength ultraviolet ray (wavelength 270 to 720 nm) using a QUV weathering tester (manufactured by Q panel) provided with a ultraviolet ray fluorescent lamp for 24 hours.

The amount of changes in b value (Δb) before and after irradiation of the skinned polyurethane foam was measured with a color difference meter (manufactured by Tokyo Denshoku CO., LTD., Color Ace MODEL TC-1) in accordance with JIS Z8722 (2009).

<Tear Strength>

An angle-shaped test piece was prepared from the skin layer of the skinned polyurethane foam, and measurement was performed in accordance with the method described in JIS K 6400 (2012).

<Presence or Absence of Silicone Compound>

Presence or absence of silicone compound (silicone-based foam stabilizer) in the skinned polyurethane foam was evaluated as "present", when it was present, or "absent" when it was absent.

TABLE 2

|  |  |  |  | No. | | | | | |
| --- | --- | --- | --- | --- | --- | --- | --- | --- | --- |
|  |  |  |  | Example 1 | Example 2 | Example 3 | Comparative Example 1 | Example 4 | Example 5 |
| Skin layer |  | No. |  | Preparation Example 1 | Preparation Example 2 | Preparation Example 3 | Preparation Example 4 | Preparation Example 9 | Preparation Example 10 |
|  |  | Polyurethane resin solution• 2-component curable polyurethane composition |  | A-3-1 | A-3-2 | A-3-3 | A-3-4 | A-3-9 | A-3-10 |
|  |  | Thickness [μm] |  | 200 | 200 | 200 | 200 | 200 | 200 |
|  |  | Storage modulus ($E'_{coat}$) (23° C.) [MPa] |  | $9.0 \times 10^7$ | $9.4 \times 10^7$ | $1.5 \times 10^8$ | $1.2 \times 10^7$ | $2 \times 10^8$ | $1.0 \times 10^8$ |
| Foam layer | Premix (B-2) | Foaming-isocyanate component (B-1) |  | 55.8 | 55.8 | 55.8 | 55.8 | 55.8 | 55.8 |
|  |  | Foaming-polyol component (B-2-1) | Polyol (B-2-1-1) | 70 | 70 | 70 | 70 | 70 | 70 |
|  |  |  | Polyol (B-2-1-2) | 30 | 30 | 30 | 30 | 30 | 30 |
|  |  |  | Polyol (B-2-1-3) | — | — | — | — | — | — |
|  |  |  | Polyol (B-2-1-4) | — | — | — | — | — | — |
|  |  |  | Polyol (B-2-1-5) | — | — | — | — | — | — |
|  |  |  | Polyol (B-2-1-6) | — | — | — | — | — | — |
|  |  |  | Polyol (B-2-1-7) | — | — | — | — | — | — |
|  |  |  | Polyol (B-2-1-8) | — | — | — | — | — | — |
|  |  | Blowing agent (B-2-2) | Water | 3 | 3 | 3 | 3 | 3 | 3 |
|  |  | Catalyst (B-2-3) | 33LV | 0.3 | 0.3 | 0.3 | 0.3 | 0.3 | 0.3 |
|  |  |  | A-1 | 0.03 | 0.03 | 0.03 | 0.03 | 0.03 | 0.03 |
|  |  | Foam stabilizer (B-2-4) | DC-2525 | 0 | 0 | 0 | 0 | 0 | 0 |
|  |  | Cell opener (B-2-5) | EP-505S | 1.5 | 1.5 | 1.5 | 1.5 | 1.5 | 1.5 |
|  |  | Fire retardant (B-2-6) | TMCPP | 10 | 10 | 10 | 10 | 10 | 10 |
|  |  |  | DAIGARD-880 | 10 | 10 | 10 | 10 | 10 | 10 |
|  |  | Isocyanate index |  | 86 | 86 | 86 | 86 | 86 | 86 |
|  | Foaming-polyol component (B-2-1) average functionality |  |  | 2.7 | 2.7 | 2.7 | 2.7 | 2.7 | 2.7 |
|  | Foaming-polyol component (B-2-1) average hydroxyl number [mg KOH/g] |  |  | 28 | 28 | 28 | 28 | 28 | 28 |
|  | Storage modulus ($E'_{foam}$) (23° C.) [MPa] |  |  | $9.9 \times 10^5$ | $9.9 \times 10^5$ | $9.9 \times 10^5$ | $9.9 \times 10^5$ | $9.9 \times 10^5$ | $9.9 \times 10^5$ |
|  | Core density [kg/m³] |  |  | 300 | 300 | 300 | 300 | 300 | 300 |
| Ratio of storage modulus (23° C.) ($E'_{coat}$)/($E'_{foam}$) |  |  |  | 91 | 95 | 152 | 12 | 20 | 101 |
| Evaluation | Wear resistance (Color Fastness Rubbing Tester) [—] |  |  | 5 | 5 | 5 | 4 | 4 | 5 |
|  | Shock absorbing characteristics (C hardness) [—] |  |  | 44 | 43 | 43 | 45 | 73 | 45 |
|  | Light resistance (Δb after light resistance test) [—] |  |  | 0.6 | 0.5 | 0.5 | 7.4 | 0.3 | 0.3 |
|  | Tear strength [N/cm] |  |  | 50.4 | 69.4 | 69.4 | 86.3 | 40.1 | 60.1 |
|  | Presence or absence of Silicone compound |  |  | Absent | Absent | Absent | Absent | Absent | Absent |

TABLE 3

| | | | Comparative Example 2 | Comparative Example 3 | Example 6 | Example 7 | Comparative Example 4 | Comparative Example 5 |
|---|---|---|---|---|---|---|---|---|
| Skin layer | No. | | Preparation Example 5 | Preparation Example 5 | Preparation Example 6 | Preparation Example 7 | Preparation Example 8 | Preparation Example 8 |
| | Polyurethane resin solution• 2-component curable polyurethane composition | | A-3-4 | A-3-4 | A-3-5 | A-3-6 | A-3-7 | A-3-7 |
| | Thickness [μm] | | 200 | 200 | 200 | 200 | 200 | 200 |
| | Storage modulus ($E'_{coat}$) (23° C.) [MPa] | | $9.4 \times 10^6$ | $9.4 \times 10^6$ | $1.5 \times 10^7$ | $2.0 \times 10^8$ | $4.0 \times 10^8$ | $4.0 \times 10^a$ |
| Foam layer | Foaming-isocyanate component (B-1) | | 55.8 | 55.8 | 55.8 | 55.8 | 55.8 | 55.8 |
| | Premix (B-2) | Foaming-polyol component (B-2-1) | Polyol (B-2-1-1) | 70 | 70 | 70 | 70 | 70 | 70 |
| | | | Polyol (B-2-1-2) | 30 | 30 | 30 | 30 | 30 | 30 |
| | | | Polyol (B-2-1-3) | — | — | — | — | — | — |
| | | | Polyol (B-2-1-4) | — | — | — | — | — | — |
| | | | Polyol (B-2-1-5) | — | — | — | — | — | — |
| | | | Polyol (B-2-1-6) | — | — | — | — | — | — |
| | | | Polyol (B-2-1-7) | — | — | — | — | — | — |
| | | | Polyol (B-2-1-8) | — | — | — | — | — | — |
| | | Blowing agent (B-2-2) | Water | 3 | 3 | 3 | 3 | 3 | 3 |
| | | Catalyst (B-2-3) | 33LV | 0.3 | 0.3 | 0.3 | 0.3 | 0.3 | 0.3 |
| | | | A-1 | 0.03 | 0.03 | 0.03 | 0.03 | 0.03 | 0.03 |
| | | Foam stabilizer (B-2-4) | DC-2525 | 0 | 2 | 0 | 0 | 0 | 2 |
| | | Cell opener (B-2-5) | EP-505S | 1.5 | 1.5 | 1.5 | 1.5 | 1.5 | 1.5 |
| | | Fire retardant (B-2-6) | TMCPP | 10 | 10 | 10 | 10 | 10 | 10 |
| | | | DAIGARD-880 | 10 | 10 | 10 | 10 | 10 | 10 |
| | Isocyanate index | | 86 | 86 | 86 | 86 | 86 | 86 |
| | Foaming-polyol component (B-2-1) average functionality | | 2.7 | 2.7 | 2.7 | 2.7 | 2.7 | 2.7 |
| | Foaming-polyol component (B-2-1) average hydroxyl number [mg KOH/g] | | 28 | 28 | 28 | 28 | 28 | 28 |
| | Storage modulus ($E'_{foam}$) (23° C.) [MPa] | | $9.9 \times 10^5$ | $9.9 \times 10^5$ | $9.9 \times 10^5$ | $9.9 \times 10^5$ | $9.9 \times 10^5$ | $9.9 \times 10^5$ |
| | Core density [kg/m$^3$] | | 300 | 300 | 300 | 300 | 300 | 300 |
| Ratio of storage modulus (23° C.) ($E'_{coat}$)/($E'_{foam}$) | | | 9 | 9 | 15 | 202 | 404 | 404 |
| Evaluation | Wear resistance (Color Fastness Rubbing Tester) [—] | | 2 | 5 | 3 | 3 | 1 | 3 |
| | Shock absorbing characteristics (C hardness) [—] | | 34 | 36 | 38 | 62 | 72 | 67 |
| | Light resistance (Δb after light resistance test) [—] | | 0.3 | 0.4 | 0.3 | 0.5 | 0.6 | 0.7 |
| | Tear strength [N/cm] | | 33.6 | 40.7 | 46.3 | 97.6 | 131.4 | 133.2 |
| | Presence or absence of Silicone compound | | Absent | Present | Absent | Absent | Absent | Present |

TABLE 4

| | | | Comparative Example 6 | Comparative Example 7 | Example 8 | Example 9 | Comparative Example 8 | Comparative Example 9 |
|---|---|---|---|---|---|---|---|---|
| Skin layer | No. | | Preparation Example 1 | Preparation Example 1 | Preparation Example 1 | Preparation Example 1 | Preparation Example 1 | Preparation Example 1 |
| | Polyurethane resin solution• 2-component curable polyurethane composition | | A-3-1 | A-3-1 | A-3-1 | A-3-1 | A-3-1 | A-3-1 |
| | Thickness [μm] | | 200 | 200 | 200 | 200 | 200 | 200 |
| | Storage modulus ($E'_{coat}$) (23° C.) [MPa] | | $9.0 \times 10^7$ | $9.0 \times 10^7$ | $9.0 \times 10^7$ | $9.0 \times 10^7$ | $9.0 \times 10^7$ | $9.0 \times 10^7$ |
| Foam layer | Foaming-isocyanate component (B-1) | | 55.8 | 55.8 | 55.8 | 55.8 | 55.8 | 55.8 |
| | Premix (B-2) Foaming-polyol component (B-2-1) | Polyol (B-2-1-1) | 70 | 70 | 70 | 70 | 70 | 70 |
| | | Polyol (B-2-1-2) | 30 | 30 | 30 | 30 | 30 | 30 |
| | | Polyol (B-2-1-3) | — | — | — | — | — | — |
| | | Polyol (B-2-1-4) | — | — | — | — | — | — |
| | | Polyol (B-2-1-5) | — | — | — | — | — | — |
| | | Polyol (B-2-1-6) | — | — | — | — | — | — |
| | | Polyol (B-2-1-7) | — | — | — | — | — | — |
| | | Polyol (B-2-1-8) | — | — | — | — | — | — |
| | Blowing agent (B-2-2) | Water | 3 | 3 | 3 | 3 | 3 | 3 |
| | Catalyst (B-2-3) | 33LV | 0.3 | 0.3 | 0.3 | 0.3 | 0.3 | 0.3 |
| | | A-1 | 0.03 | 0.03 | 0.03 | 0.03 | 0.03 | 0.03 |
| | Foam stabilizer (B-2-4) | DC-2525 | 0 | 2 | 0 | 0 | 0 | 2 |
| | Cell opener (B-2-5) | EP-505S | 1.5 | 1.5 | 1.5 | 1.5 | 1.5 | 1.5 |
| | Fire retardant (B-2-6) | TMCPP | 10 | 10 | 10 | 10 | 10 | 10 |
| | | DAIGARD-880 | 10 | 10 | 10 | 10 | 10 | 10 |
| | Isocyanate index | | 86 | 86 | 86 | 86 | 86 | 86 |
| | Foaming-polyol component (B-2-1) average functionality | | 2.7 | 2.7 | 2.7 | 2.7 | 2.7 | 2.7 |
| | Foaming-polyol component (B-2-1) average hydroxyl number [mg KOH/g] | | 28 | 28 | 28 | 28 | 28 | 28 |
| | Storage modulus ($E'_{foam}$) (23° C.) [MPa] | | $9.4 \times 10^4$ | $9.4 \times 10^4$ | $2.7 \times 10^5$ | $3.9 \times 10^6$ | $8.8 \times 10^6$ | $8.8 \times 10^6$ |
| | Core density [kg/m³] | | 100 | 100 | 150 | 400 | 500 | 500 |
| | Ratio of storage modulus (23° C.) ($E'_{coat}$)/($E'_{foam}$) | | 954 | 954 | 340 | 23 | 10 | 10 |
| Evaluation | Wear resistance (Color Fastness Rubbing Tester) [—] | | 5 | 5 | 5 | 5 | 5 | 5 |
| | Shock absorbing characteristics (C hardness) [—] | | 30 | 29 | 33 | 53 | 74 | 68 |
| | Light resistance (Δb after light resistance test) [—] | | 0.7 | 0.6 | 0.6 | 0.4 | 0.6 | 0.6 |
| | Tear strength [N/cm] | | 37.3 | 47.3 | 40.1 | 70.6 | 85.2 | 90.4 |
| | Presence or absence of Silicone compound | | Absent | Present | Absent | Absent | Absent | Present |

TABLE 5

| | | Comparative Example 10 | Comparative Example 11 | Example 10 | Example 11 | Example 12 | Example 13 |
|---|---|---|---|---|---|---|---|
| Skin layer | No. | Preparation Example 6 | Preparation Example 7 | Preparation Example 1 | Preparation Example 1 | Preparation Example 1 | Preparation Example 1 |
| | Polyurethane resin solution• 2-component curable polyurethane composition | A-3-5 | A-3-6 | A-3-1 | A-3-1 | A-3-1 | A-3-1 |
| | Thickness [μm] | 200 | 200 | 40 | 100 | 600 | 1100 |
| | Storage modulus ($E'_{coat}$) (23° C.) [MPa] | $1.5 \times 10^7$ | $2.0 \times 10^8$ | $1.0 \times 10^7$ | $1.2 \times 10^7$ | $9.8 \times 10^7$ | $1.5 \times 10^8$ |

TABLE 5-continued

| | | | Comparative Example 10 | Comparative Example 11 | Example 10 | Example 11 | Example 12 | Example 13 |
|---|---|---|---|---|---|---|---|---|
| Foam layer | Foaming-isocyanate component (B-1) | | 55.8 | 55.8 | 55.8 | 55.8 | 55.8 | 55.8 |
| | Premix (B-2) | Foaming-polyol component (B-2-1) | Polyol (B-2-1-1) | 70 | 70 | 70 | 70 | 70 | 70 |
| | | | Polyol (B-2-1-2) | 30 | 30 | 30 | 30 | 30 | 30 |
| | | | Polyol (B-2-1-3) | — | — | — | — | — | — |
| | | | Polyol (B-2-1-4) | — | — | — | — | — | — |
| | | | Polyol (B-2-1-5) | — | — | — | — | — | — |
| | | | Polyol (B-2-1-6) | — | — | — | — | — | — |
| | | | Polyol (B-2-1-7) | — | — | — | — | — | — |
| | | | Polyol (B-2-1-8) | — | — | — | — | — | — |
| | | Blowing agent (B-2-2) | Water | 3 | 3 | 3 | 3 | 3 | 3 |
| | | Catalyst (B-2-3) | 33LV | 0.3 | 0.3 | 0.3 | 0.3 | 0.3 | 0.3 |
| | | | A-1 | 0.03 | 0.03 | 0.03 | 0.03 | 0.03 | 0.03 |
| | | Foam stabilizer (B-2-4) | DC-2525 | 0 | 0 | 0 | 0 | 0 | 0 |
| | | Cell opener (B-2-5) | EP-505S | 1.5 | 1.5 | 1.5 | 1.5 | 1.5 | 1.5 |
| | | Fire retardant (B-2-6) | TMCPP | 10 | 10 | 10 | 10 | 10 | 10 |
| | | | DAIGARD-880 | 10 | 10 | 10 | 10 | 10 | 10 |
| | Isocyanate index | | 86 | 86 | 86 | 86 | 86 | 86 |
| | Foaming-polyol component (B-2-1) average functionality | | 2.7 | 2.7 | 2.7 | 2.7 | 2.7 | 2.7 |
| | Foaming-polyol component (B-2-1) average hydroxyl number [mg KOH/g] | | 28 | 28 | 32.2 | 32.2 | 32.2 | 32.2 |
| | Storage modulus ($E'_{foam}$) (23° C.) [MPa] | | $3.9 \times 10^6$ | $2.7 \times 10^5$ | $9.90 \times 10^5$ | $9.90 \times 10^5$ | $9.90 \times 10^5$ | $9.90 \times 10^5$ |
| | Core density [kg/m³] | | 400 | 150 | 300 | 300 | 300 | 300 |
| | Ratio of storage modulus (23° C.) ($E'_{coat}$)/($E'_{foam}$) | | 4 | 74.1 | 10 | 12 | 99 | 152 |
| Evaluation | Wear resistance (Color Fastness Rubbing Tester) [—] | | 2 | 4 | 3 | 5 | 5 | 5 |
| | Shock absorbing characteristics (C hardness) [—] | | 50 | 71 | 44 | 45 | 51 | 63 |
| | Light resistance (Δb after light resistance test) [—] | | 0.6 | 0.6 | 0.7 | 0.6 | 0.5 | 0.4 |
| | Tear strength [N/cm] | | 79.3 | 65.2 | 40.1 | 45.3 | 83.5 | 121.1 |
| | Presence or absence of Silicone compound | | Absent | Absent | Absent | Absent | Absent | Absent |

TABLE 6

| | | Example 14 | Example 15 | Example 16 | Example 17 |
|---|---|---|---|---|---|
| Skin layer | No. | Preparation Example 1 | Preparation Example 1 | Preparation Example 1 | Preparation Example 1 |
| | Polyurethane resin solution• 2-component curable polyurethane composition | A-3-1 | A-3-1 | A-3-1 | A-3-1 |
| | Thickness [μm] | 200 | 200 | 200 | 200 |
| | Storage modulus ($E'_{coat}$) (23° C.) [MPa] | $9.0 \times 10^7$ | $9.0 \times 10^7$ | $9.0 \times 10^7$ | $9.0 \times 10^7$ |

TABLE 6-continued

| | | | | No. | | | |
|---|---|---|---|---|---|---|---|
| | | | | Example 14 | Example 15 | Example 16 | Example 17 |
| Foam layer | Foaming-isocyanate component (B-1) | | | 55.2 | 55.5 | 56.1 | 57.1 |
| | Premix (B-2) | Foaming-polyol component (B-2-1) | Polyol (B-2-1-1) | 30 | 50 | 50 | — |
| | | | Polyol (B-2-1-2) | 70 | 50 | — | — |
| | | | Polyol (B-2-1-3) | — | — | 50 | 50 |
| | | | Polyol (B-2-1-4) | — | — | — | 50 |
| | | | Polyol (B-2-1-5) | — | — | — | — |
| | | | Polyol (B-2-1-6) | — | — | — | — |
| | | | Polyol (B-2-1-7) | — | — | — | — |
| | | | Polyol (B-2-1-8) | — | — | — | — |
| | | Blowing agent (B-2-2) | Water | 3 | 3 | 3 | 3 |
| | | Catalyst (B-2-3) | 33LV | 0.3 | 0.3 | 0.3 | 0.3 |
| | | | A-1 | 0.03 | 0.03 | 0.03 | 0.03 |
| | | Foam stabilizer (B-2-4) | DC-2525 | 0 | 0 | 0 | 0 |
| | | Cell opener (B-2-5) | EP-505S | 1.5 | 1.5 | 1.5 | 1.5 |
| | | Fire retardant (B-2-6) | TMCPP | 10 | 10 | 10 | 10 |
| | | | DAIGARD-880 | 10 | 10 | 10 | 10 |
| | Isocyanate index | | | 86 | 86 | 86 | 86 |
| | Foaming-polyol component (B-2-1) average functionality | | | 2.3 | 2.5 | 3.5 | 4.6 |
| | Foaming-polyol component (B-2-1) average hydroxyl number [mg KOH/g] | | | 29.8 | 31 | 31 | 35 |
| | Storage modulus ($E'_{foam}$) (23° C.) [MPa] | | | $9.50 \times 10^5$ | $1.50 \times 10^6$ | $2.00 \times 10^6$ | $4.00 \times 10^6$ |
| | Core density [kg/m$^3$] | | | 300 | 300 | 300 | 300 |
| | Ratio of storage modulus (23° C.) ($E'_{coat}$)/($E'_{foam}$) | | | 95 | 60 | 45 | 23 |
| Evaluation | Wear resistance (Color Fastness Rubbing Tester) [—] | | | 5 | 5 | 5 | 5 |
| | Shock absorbing characteristics (C hardness) [—] | | | 44 | 45 | 49 | 54 |
| | Light resistance (Δb after light resistance test) [—] | | | 0.5 | 0.6 | 0.4 | 0.6 |
| | Tear strength [N/cm] | | | 43.4 | 47.5 | 50.3 | 85.1 |
| | Presence or absence of Silicone compound | | | Absent | Absent | Absent | Absent |

TABLE 7

| | | | | No. | | | |
|---|---|---|---|---|---|---|---|
| | | | | Example 18 | Example 19 | Example 20 | Example 21 |
| Skin layer | No. | | | Preparation Example 1 A-3-1 | Preparation Example 1 A-3-1 | Preparation Example 1 A-3-1 | Preparation Example 1 A-3-1 |
| | Polyurethane resin solution• 2-component curable polyurethane composition | | | | | | |
| | Thickness [μm] | | | 200 | 200 | 200 | 200 |
| | Storage modulus ($E'_{coat}$) (23° C.) [MPa] | | | $9.0 \times 10^7$ | $9.0 \times 10^7$ | $9.0 \times 10^7$ | $9.0 \times 10^7$ |
| Foam layer | Foaming-isocyanate component (B-1) | | | 52.4 | 53.7 | 61.8 | 90.2 |
| | Premix (B-2) | Foaming-polyol component (B-2-1) | Polyol (B-2-1-1) | — | — | — | — |
| | | | Polyol (B-2-1-2) | — | — | — | — |
| | | | Polyol (B-2-1-3) | — | — | — | — |

TABLE 7-continued

| | | Example 18 | Example 19 | Example 20 | Example 21 |
|---|---|---|---|---|---|
| | Polyol (B-2-1-4) | — | — | — | — |
| | Polyol (B-2-1-5) | 100 | — | — | — |
| | Polyol (B-2-1-6) | — | 100 | — | — |
| | Polyol (B-2-1-7) | — | — | 100 | — |
| | Polyol (B-2-1-8) | — | — | — | 100 |
| Blowing agent (B-2-2) | Water | 3 | 3 | 3 | 3 |
| Catalyst (B-2-3) | 33LV | 0.3 | 0.3 | 0.3 | 0.3 |
| | A-1 | 0.03 | 0.03 | 0.03 | 0.03 |
| Foam stabilizer (B-2-4) | DC-2525 | 0 | 0 | 0 | 0 |
| Cell opener (B-2-5) | EP-505S | 1.5 | 1.5 | 1.5 | 1.5 |
| Fire retardant (B-2-6) | TMCPP | 10 | 10 | 10 | 10 |
| | DAIGARD-880 | 10 | 10 | 10 | 10 |
| Isocyanate index | | 86 | 86 | 86 | 86 |
| Foaming-polyol component (B-2-1) average functionality | | 3 | 3 | 3 | 3 |
| Foaming-polyol component (B-2-1) average hydroxyl number[mg KOH/g] | | 19 | 24 | 56 | 84 |
| Storage modulus ($E'_{foam}$) (23° C.) [MPa] | | $6.85 \times 10^5$ | $8.76 \times 10^5$ | $1.19 \times 10^6$ | $4.19 \times 10^6$ |
| Core density[kg/m³] | | 300 | 300 | 300 | 300 |
| Ratio of storage modulus (23° C.) ($E'_{coat}$)/($E'_{foam}$) | | 131 | 103 | 76 | 21 |
| Evaluation | Wear resistance (Color Fastness Rubbing Tester) [—] | 5 | 5 | 5 | 5 |
| | Shock absorbing characteristics (C hardness) [—] | 40 | 42 | 53 | 65 |
| | Light resistance (Δb after light resistance test) [—] | 0.5 | 0.5 | 0.5 | 0.6 |
| | Tear strength [N/cm] | 40 | 43.6 | 86.2 | 130.1 |
| | Presence or absence of Silicone compound | Absent | Absent | Absent | Absent |

Abbreviations in Tables are shown below.
Blowing agent (B-2-2)
Water: ion-exchange water
Catalyst (B-2-3)
  33 LV: DABCO 33 LV manufactured by Air Products & Chemicals
  A-1: Niax A-1 manufactured by Momentive Performance Materials
Foam stabilizer (B-2-4)
DC2525: DABCO DC-2525 manufactured by Air Products & Chemicals, silicone-based foam stabilizer
Communicating agent (B-2-5)
EP-505S: polyalkylene (C2 to 3) polyol with average functionality 3, weight-average molecular weight 3300, a hydroxyl number of 52 mg KOH/g, and an ethylene oxide content of 75 mass %, manufactured by Mitsui Chemicals. Inc.
Fire retardant (B-2-6)
TMCPP: halogen-containing organic phosphorus compound-type fire retardant manufactured by DAIHACHI CHEMICAL INDUSTRY CO., LTD., tris (β-chloropropyl) phosphate (TCPP) DAIGARD-880: non-halogen organic phosphorus compound-type fire retardant manufactured by DAIHACHI CHEMICAL INDUSTRY CO., LTD., While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The buffer material and robot-with-buffer material of the present invention is suitably used for industrial robots including coating robots, welding robots, assembling robots, grinding/deburring robots, shipping and receiving management robots, work assisting robots, agricultural work robots, and livestock robots; non-industrial robots including hotel service robot, security robot, cleaning robot, communication robot, entertainment robot, multi-purpose robot, medical robot, walfare robot, disaster coping robot, explorer robot, marine robot, atomic robot, astrological robot, and construction robot; and for example, cutting machine, radio controlled helicopter, radio controlled automobile, radio controlled motorcycle, and pitching machine.

DESCRIPTION OF REFERENCE NUMERALS

1 buffer material
2 skinned polyurethane foam
3 foam layer 4 skin layer

The invention claimed is:

1. A buffer material comprising:
   a skinned polyurethane foam including a foam layer and a skin layer formed on the surface of the foam layer,
   wherein the skinned polyurethane foam essentially contains no silicone compound,
   the silicone compound relative to the skinned polyurethane foam is 500 ppm or less,
   the foam layer is polyurethane foam produced by reaction of a foaming-isocyanate component with a foaming-active hydrogen group-containing component,
   the foaming-isocyanate component is an isocyanate group-terminated prepolymer produced by reaction of aromatic polyisocyanate and/or derivative thereof with high-molecular weight polyol,
   the skin layer is a polyurethane resin layer produced by reaction of a skin-isocyanate component containing an aliphatic polyisocyanate and/or an alicyclic polyisocyanate with a skin-active hydrogen group-containing component,
   the skin layer has a storage modulus at 23° C. ($E'_{coat}$) of $1\times10^7$ Pa or more and $3\times10^8$ Pa or less,
   the foam layer has a storage modulus at 23° C. ($E'_{foam}$) of $1\times10^5$ Pa or more and $5\times10^6$ Pa or less, and
   the ratio ($E'_{coat}/E'_{foam}$) of the storage modulus at 23° C. ($E'_{coat}$) of the skin layer relative to the storage modulus at 23° C. ($E'_{foam}$) of the foam layer is 10 or more and 500 or less.

2. The buffer material according to claim 1, wherein the skin layer has a thickness of 45 μm or more and 1000 μm or less.

3. The buffer material according to claim 1, wherein the skinned polyurethane foam has a core density of 100 kg/m$^3$ or more and 500 kg/m$^3$ or less.

4. The buffer material according to claim 1, wherein the foaming-active hydrogen group-containing component has an average functionality of 2.5 or more and 4.0 or less, and an average hydroxyl number of 20 mg KOH/g or more and 70 mg KOH/g or less.

5. A buffer material for coating robot, wherein the buffer material is the buffer material according to claim 1, and is used for a coating robot.

6. A robot-with-buffer material comprising the buffer material according to claim 1, and a robot.

7. A coating robot-with-buffer material comprising the buffer material for coating robot according to claim 5, and a coating robot.

* * * * *